United States Patent
Zou et al.

(10) Patent No.: US 11,821,662 B2
(45) Date of Patent: Nov. 21, 2023

(54) THERMAL ENERGY STORAGE INTEGRATED HEAT PUMP

(71) Applicant: Rheem Manufacturing Company, Atlanta, GA (US)

(72) Inventors: Yang Zou, Frisco, TX (US); Sivakumar Gopalnarayanan, Plano, TX (US)

(73) Assignee: Rheem Manufacturing Company, Atlanta, GA (US)

( * ) Notice: Subject to any disclaimer, the term of this patent is extended or adjusted under 35 U.S.C. 154(b) by 66 days.

(21) Appl. No.: 17/510,562

(22) Filed: Oct. 26, 2021

(65) Prior Publication Data
US 2023/0130780 A1    Apr. 27, 2023

(51) Int. Cl.
| | |
|---|---|
| *F25B 30/02* | (2006.01) |
| *F24D 5/12* | (2006.01) |
| *F24D 17/02* | (2006.01) |
| *F25B 7/00* | (2006.01) |

(52) U.S. Cl.
CPC ............ *F25B 30/02* (2013.01); *F24D 5/12* (2013.01); *F24D 17/02* (2013.01); *F25B 7/00* (2013.01)

(58) Field of Classification Search
CPC .... F25B 30/02; F25B 7/00; F24D 5/12; F24D 17/02
See application file for complete search history.

(56) References Cited

U.S. PATENT DOCUMENTS

| | | | | |
|---|---|---|---|---|
| 5,044,431 A | * | 9/1991 | Cameron | .............. F28F 9/22 |
| | | | | 165/158 |
| 2019/0242657 A1 | | 8/2019 | Kirill et al. | |

FOREIGN PATENT DOCUMENTS

| | | | | |
|---|---|---|---|---|
| CN | 105783317 A | * | 7/2016 | .............. F25B 41/04 |
| CN | 105783317 B | | 8/2018 | |
| DE | 10224754 A1 | | 12/2003 | |
| EP | 3303028 A1 | | 4/2018 | |

OTHER PUBLICATIONS

PCT, "International Search Report & Written Opinion" Application No. PCT/US2022/044884, dated Dec. 19, 2022, 12 pages.

* cited by examiner

*Primary Examiner* — Ana M Vazquez
(74) *Attorney, Agent, or Firm* — Eversheds Sutherland (US) LLP

(57) ABSTRACT

The disclosed technology includes a heat pump having a thermal energy storage (TES) material. The heat pump can include a first heat exchanger to exchange heat between ambient air and refrigerant, a second heat exchanger to exchange heat between the refrigerant and air supplied to a climate-controlled space, and a third heat exchanger to exchange heat between the TES material and the refrigerant in a first fluid path and the refrigerant in a second fluid path. The heat pump can include a first compressor to circulate refrigerant to the first, second, and third heat exchangers and a second compressor to circulate refrigerant to the second and third heat exchangers. The first compressor can facilitate heat exchange between the ambient air and the TES material and the second compressor can facilitate heat exchange between the TES material and the air supplied to the climate-controlled space.

18 Claims, 15 Drawing Sheets

Simple Heating

Simple Heating

Simple Cooling

TES Charging Only

TES Charging + Heating

Space Heating + TES Discharging

Cascade Heating

Defrost With TES

Space Cooling + TES Charging

Cascade Cooling

THERMAL ENERGY STORAGE INTEGRATED HEAT PUMP

FIELD OF THE DISCLOSURE

The present invention relates generally to heat pump systems, and more particularly, to a heat pump system including a three-fluid heat exchanger in which thermal energy storage material is one fluid.

BACKGROUND

Heat pump systems are becoming increasingly more common as many industries move away from pollution-emitting combustion furnaces or heating systems and toward more efficient and environmentally-friendly systems. Rather than create heat energy directly through combustion or other energy sources, heat pumps are generally designed to transfer heat from one area to another area. In heating applications, heat pumps can transfer heat from a heat source (e.g., ambient air, geothermal heat sources, etc.) to a climate-controlled space (e.g., a building, a residential home, or other heated space) using a vapor-compression cycle. In cooling applications, the heat pumps can transfer heat from a climate-controlled space and discharge the heat to ambient air or another location. Thus, heat pumps can be used to efficiently heat or cool a building or other space to a comfortable temperature for occupants of the space.

Heat pump systems typically include a compressor, a condenser, an expansion valve, and an evaporator. As refrigerant is circulated by the compressor through the condenser, expansion valve, and evaporator, the refrigerant is transitioned between vapor and liquid phases causing heat to be absorbed by the refrigerant at the evaporator and released by the refrigerant at the condenser. The condenser can be a heat exchanger configured to transfer the heat from the refrigerant to air circulated through the building. By utilizing a vapor-compression cycle, heat pumps are able to heat a building efficiently without creating harmful combustion gasses or other pollutant byproducts.

Unfortunately, heat pumps have been limited in their application due to many heat pump systems being unable to effectively heat a building in low ambient temperatures. Thus, heat pumps have typically not been effectively implemented in regions having cooler climates. This is because the heat pump must work harder to heat the building as the ambient temperature decreases due to less heat energy being available in the ambient air.

One method of sufficiently heating a building in cool climates includes arranging two heat pumps in a cascading configuration. As illustrated in FIG. 1, existing cascade heat pump systems 100 include two or more compressors 102A, 102B and two or more expansion valves 106A, 106B. The first compressor 102A can circulate a first refrigerant through an intermediate heat exchanger 130, a first expansion valve 106A, and an evaporator 108. The intermediate heat exchanger 130 can facilitate heat transfer between the first refrigerant and a second refrigerant circulated by the second compressor 102B to heat the second refrigerant. Because the second refrigerant is heated by the first refrigerant, the second refrigerant can be heated to a higher temperature to sufficiently heat a building in cooler climates. However, because cascading heat pump systems must operate both compressors in order to heat a building, cascading heat pump systems tend to inefficiently consume a large amount of energy. This is particularly true in regions where the climate is warm for some time during the year. That is to say, existing cascade heat pump systems 100 require both refrigerant circuits—and in particular, both compressors—to simultaneously operate in order the for the heat pump system 100 to function. This can become unnecessary and inefficient when the ambient temperature increases to a value greater than a certain threshold temperature for a given cascade heat pump system 100, thus reducing the annual benefit that can be realized from the cascade heat pump system 100.

What is needed, therefore, is a heat pump system that can sufficiently heat a building in low ambient temperature conditions while also increasing the overall efficiency of the heat pump in both cool and warm ambient temperatures.

SUMMARY

These and other problems can be addressed by the technologies described herein. Examples of the present disclosure relate generally to heat pump systems, and more particularly, to a heat pump system including a three-fluid heat exchanger in which thermal energy storage material is one fluid.

The disclosed technology can include a heat pump system comprising a first heat exchanger configured to facilitate heat exchange between ambient air proximate the first heat exchanger and a refrigerant, a second heat exchanger configured to facilitate heat exchange between the refrigerant and air supplied to a climate-controlled space, and a third heat exchanger comprising a thermal energy storage (TES) material, a first fluid pathway, and a second fluid pathway. The heat pump system can further include a first compressor and a second compressor. The heat pump system can include a first fluid path comprising the first compressor, the first heat exchanger, and the first fluid pathway of the third heat exchanger, the first fluid path being configured to selectively direct at least some of the refrigerant therethrough; and a second fluid path comprising the second compressor, the second heat exchanger, and the second fluid pathway of the third heat exchanger, the second fluid path being configured to selectively direct at least some of the refrigerant therethrough.

The first compressor can be configured to selectively facilitate heat exchange, via the refrigerant in the first fluid path, between the ambient air proximate the first heat exchanger and the TES material in the third heat exchanger. The second compressor can be configured to selectively facilitate heat exchange, via the refrigerant in the second fluid path, between the TES material in the third heat exchanger and air supplied to the climate-controlled space proximate the second heat exchanger.

The heat pump system can further include a first fluid path connector connecting the first fluid path and the second fluid path via a first end of the third heat exchanger and a first end of the second heat exchanger; and a second fluid path connector connecting the first fluid path and the second fluid path via a second end of the third heat exchanger and a second end of the second heat exchanger. The heat pump system can also include one or more control valves that can be configured to control a flow of the refrigerant to the first heat exchanger, the second heat exchanger, and the third heat exchanger. The heat pump system can include a TES temperature sensor configured to detect a temperature of the TES material and a controller configured to receive TES temperature data from the TES temperature sensor. The controller can determine, based at least in part on the TES temperature data, whether to actuate the one or more control valves to permit refrigerant to flow to the first heat exchanger, the second heat exchanger, or the third heat exchanger.

The controller can be configured to determine, based at least in part on the TES temperature data, whether the temperature of the TES material is greater than a TES threshold temperature. In response to determining that the temperature of the TES material is greater than the TES threshold temperature, the controller can output a control signal to: (1) actuate the one or more control valves to permit the refrigerant to flow between the second heat exchanger and the third heat exchanger, and (2) activate the second compressor to cause the refrigerant to flow between the third heat exchanger and the second heat exchanger to heat the climate-controlled space.

In response to determining that the temperature of the TES material is less than or equal to the TES threshold temperature, the controller can be further configured to output a control signal to: (1) actuate the one or more control valves to permit the refrigerant to flow between the first heat exchanger and the third heat exchanger, and (2) activate the first compressor to cause the refrigerant to flow between the first heat exchanger and the third heat exchanger to provide thermal energy to the TES material.

The heat pump system can further include an ambient air temperature sensor configured to detect a temperature of the ambient air proximate the first heat exchanger. The controller is further can be further configured to receive ambient air temperature data from the ambient air temperature sensor and determine, based at least in part on the ambient air temperature data, whether the temperature or the ambient air is less than or equal to an ambient air threshold temperature. The controller can be configured to determine, based at least in part on the TES temperature data, whether the temperature of the TES material is greater than a TES threshold temperature. In response to determining that the temperature of the ambient air is less than or equal to the ambient air threshold temperature and the temperature of the TES material is greater than the TES threshold temperature, the controller can be configured to output a control signal to: (1) actuate the one or more control valves to permit the refrigerant to flow between the second heat exchanger and the third heat exchanger, and (2) activate the second compressor to cause refrigerant to flow between the second heat exchanger and the third heat exchanger to heat the climate-controlled space.

In response to determining that the temperature of the ambient air is less than or equal to the ambient air threshold temperature and the temperature of the TES material is less than or equal to the TES threshold temperature, the controller can be further configured to output a control signal to: (1) actuate the one or more control valves to permit the refrigerant to flow between the first heat exchanger and the third heat exchanger and between the second heat exchanger and the third heat exchanger, (2) activate the first compressor to cause the refrigerant to flow between the first heat exchanger and the third heat exchanger to provide thermal energy to the TES material, and (3) activate the second compressor to cause refrigerant to flow between the third heat exchanger and the second heat exchanger to heat the climate-controlled space.

In response to determining that the temperature of the ambient air is greater than the ambient air threshold temperature and the temperature of the TES material is greater than the TES threshold temperature, the controller can be further configured to output a control signal to: (1) actuate the one or more control valves to permit the refrigerant to flow between the first heat exchanger and the second heat exchanger, and (2) activate the first compressor to cause the refrigerant to flow between the first heat exchanger and the second heat exchanger to heat the climate-controlled space.

The heat pump system can further include a coil temperature sensor configured to detect a temperature of the first heat exchanger and a reversing valve configured to reverse a direction of the flow of the refrigerant. The controller can be further configured to receive coil temperature data from the coil temperature sensor and determine, based at least in part on the coil temperature data, whether the temperature of the first heat exchanger is less than or equal to a coil threshold temperature. The coil threshold temperature can be a temperature at which frost will begin to accumulate on the first heat exchanger.

In response to determining that the temperature of the first heat exchanger is less than or equal to the coil threshold temperature, the controller can be configured to output a control signal to: (1) actuate the reversing valve to reverse a direction of the flow of the refrigerant, (2) actuate the one or more control valves to permit the refrigerant to flow between the first heat exchanger and the second heat exchanger, and (3) activate the first compressor to cause refrigerant to flow between the first heat exchanger and the second heat exchanger to defrost the first heat exchanger.

In response to determining that the temperature of the first heat exchanger is less than or equal to the coil threshold temperature and the temperature of the TES material is greater than the TES threshold temperature, the controller can be further configured to output a control signal to: (1) actuate the reversing valve to reverse a direction of the flow of the refrigerant, (2) actuate the one or more control valves to permit the refrigerant to flow between the first heat exchanger and the third heat exchanger, and (3) activate the first compressor to cause refrigerant to flow between the first heat exchanger and the third heat exchanger to defrost the first heat exchanger.

The heat pump system can further include an indoor air temperature sensor configured to detect a temperature of air in the climate-controlled space. The controller being further configured to receive indoor air temperature data from the indoor air temperature sensor and determine, based at least in part on the indoor air temperature data, whether the temperature in the climate-controlled space is less than or equal to an indoor threshold temperature. In response to determining that the temperature of the air in the climate-controlled space is less than an indoor air threshold temperature, the ambient air is less than or equal to the ambient air threshold temperature, and the temperature of the TES material is greater than the TES threshold temperature, the controller can be further configured to output a control signal to: (1) actuate the one or more control valves to permit the refrigerant to flow between the second heat exchanger and the third heat exchanger, and (2) activate the second compressor to cause refrigerant to flow between the second heat exchanger and the third heat exchanger to heat the climate-controlled space.

In response to determining that the temperature of the air in the climate-controlled space is less than an indoor air threshold temperature and the temperature of the TES material is less than or equal to the TES threshold temperature, the controller can be further configured to output a control signal to: (1) actuate the one or more control valves to permit the refrigerant to flow between the first heat exchanger and the third heat exchanger and between the second heat exchanger and the third heat exchanger, (2) activate the first compressor to cause the refrigerant to flow between the first heat exchanger and the third heat exchanger to provide thermal energy to the TES material, and (3) activate the second compressor to cause refrigerant to flow between the third heat exchanger and the second heat exchanger to heat the climate-controlled space.

The heat pump system can further include a reversing valve configured to reverse a direction of the flow of the refrigerant. In response to determining that the temperature of the air in the climate-controlled space is greater than the indoor air threshold temperature, the controller can be further configured to output a control signal to: (1) actuate the reversing valve to reverse a direction of the flow of the refrigerant, (2) actuate the one or more control valves to permit the refrigerant to flow between the first heat exchanger and the second heat exchanger, and (3) activate the first compressor to cause refrigerant to flow between the first heat exchanger and the second heat exchanger to cool the climate-controlled space.

The third heat exchanger can include a shell configured to house the TES material, a first tube bundle configured to receive the refrigerant in the first fluid path, and a second tube bundle configured to receive the refrigerant in the second fluid path.

The third heat exchanger can include a first tube configured to receive the refrigerant in the first fluid path, a second tube configured to house the first tube and the TES material, and a third tube configured to house the first tube and the second tube and receive the refrigerant in the second fluid path.

The third heat exchanger is a microchannel heat exchanger that can include a first microchannel tube configured to receive the refrigerant in the first fluid path, a second microchannel tube configured to receive the refrigerant in the second fluid path, and a housing having a plurality of plates and configured to house the TES material.

The disclosed technology can include a method of controlling a heat pump. The method can include receiving thermal energy storage (TES) temperature data from a TES temperature sensor. The TES temperature sensor can be configured to detect a temperature of a TES material. The method can include determining, based at least in part on the TES temperature data, whether to actuate one or more control valves and activate a compressor of the heat pump to cause refrigerant to flow through at least one of a first heat exchanger, a second heat exchanger, or a third heat exchanger. The first heat exchanger can be configured to facilitate heat exchange between ambient air and a refrigerant, the second heat exchanger can configured to facilitate heat exchange between the refrigerant and air supplied to a climate-controlled space, and the third heat exchanger can include the TES material and be configured to facilitate heat exchange between the TES material and at least one of the refrigerant in a first fluid path or the refrigerant in a second fluid path.

The method can further include determining, based at least in part on the TES temperature data, whether the temperature of the TES material is greater than a TES threshold temperature. In response to determining that the temperature of the TES material is greater than the TES threshold temperature, the method can include outputting a control signal to: (1) actuate the one or more control valves to permit the refrigerant to flow between the second heat exchanger and the third heat exchanger, and (2) activate the compressor to cause the refrigerant to flow between the second heat exchanger and the third heat exchanger to heat the climate-controlled space.

In response to determining that the temperature of the TES material is less than or equal to the TES threshold temperature, the method can further include outputting a control signal to: (1) actuate the one or more control valves to permit the refrigerant to flow between the first heat exchanger and the third heat exchanger, and (2) activate the compressor to cause the refrigerant to flow between the first heat exchanger and the third heat exchanger to provide thermal energy to the TES material.

The method can further include receiving, from an ambient air temperature sensor configured to detect a temperature of ambient air, ambient air temperature data and determining, based at least in part on the ambient air temperature data, whether the temperature or the ambient air is less than or equal to an ambient air threshold temperature. The method can include determining, based at least in part on the TES temperature data, whether the temperature of the TES material is greater than a TES threshold temperature. In response to determining that the temperature of the ambient air is less than or equal to the ambient air threshold temperature and the temperature of the TES material is greater than the TES threshold temperature, the method can include outputting a control signal to: (1) actuate the one or more control valves to permit the refrigerant to flow between the second heat exchanger and the third heat exchanger, and (2) activate the compressor to cause refrigerant to flow between the second heat exchanger and the third heat exchanger to heat the climate-controlled space.

The compressor can include a first compressor and a second compressor. In response to determining that the temperature of the ambient air is less than or equal to the ambient air threshold temperature and the temperature of the TES material is less than or equal to the TES threshold temperature, the method can further include outputting a control signal to: (1) actuate the one or more control valves to permit the refrigerant to flow between the first heat exchanger and the third heat exchanger and between the second heat exchanger and the third heat exchanger, (2) activate the first compressor to cause the refrigerant to flow between the first heat exchanger and the third heat exchanger to provide thermal energy to the TES material, and (3) activate the second compressor to cause refrigerant to flow between the third heat exchanger and the second heat exchanger to heat the climate-controlled space.

These and other aspects of the present disclosure are described in the Detailed Description below and the accompanying figures. Other aspects and features of the present disclosure will become apparent to those of ordinary skill in the art upon reviewing the following description of specific examples of the present disclosure in concert with the figures. While features of the present disclosure may be discussed relative to certain examples and figures, all examples of the present disclosure can include one or more of the features discussed herein. Further, while one or more examples may be discussed as having certain advantageous features, one or more of such features may also be used with the various other examples of the disclosure discussed herein. In similar fashion, while examples may be discussed below as devices, systems, or methods, it is to be understood that such examples can be implemented in various devices, systems, and methods of the present disclosure.

BRIEF DESCRIPTION OF THE FIGURES

The accompanying drawings, which are incorporated in and constitute a part of this specification, illustrate various aspects of the presently disclosed subject matter and serve to explain the principles of the presently disclosed subject matter. The drawings are not intended to limit the scope of the presently disclosed subject matter in any manner.

DETAILED DESCRIPTION

Figure 1:
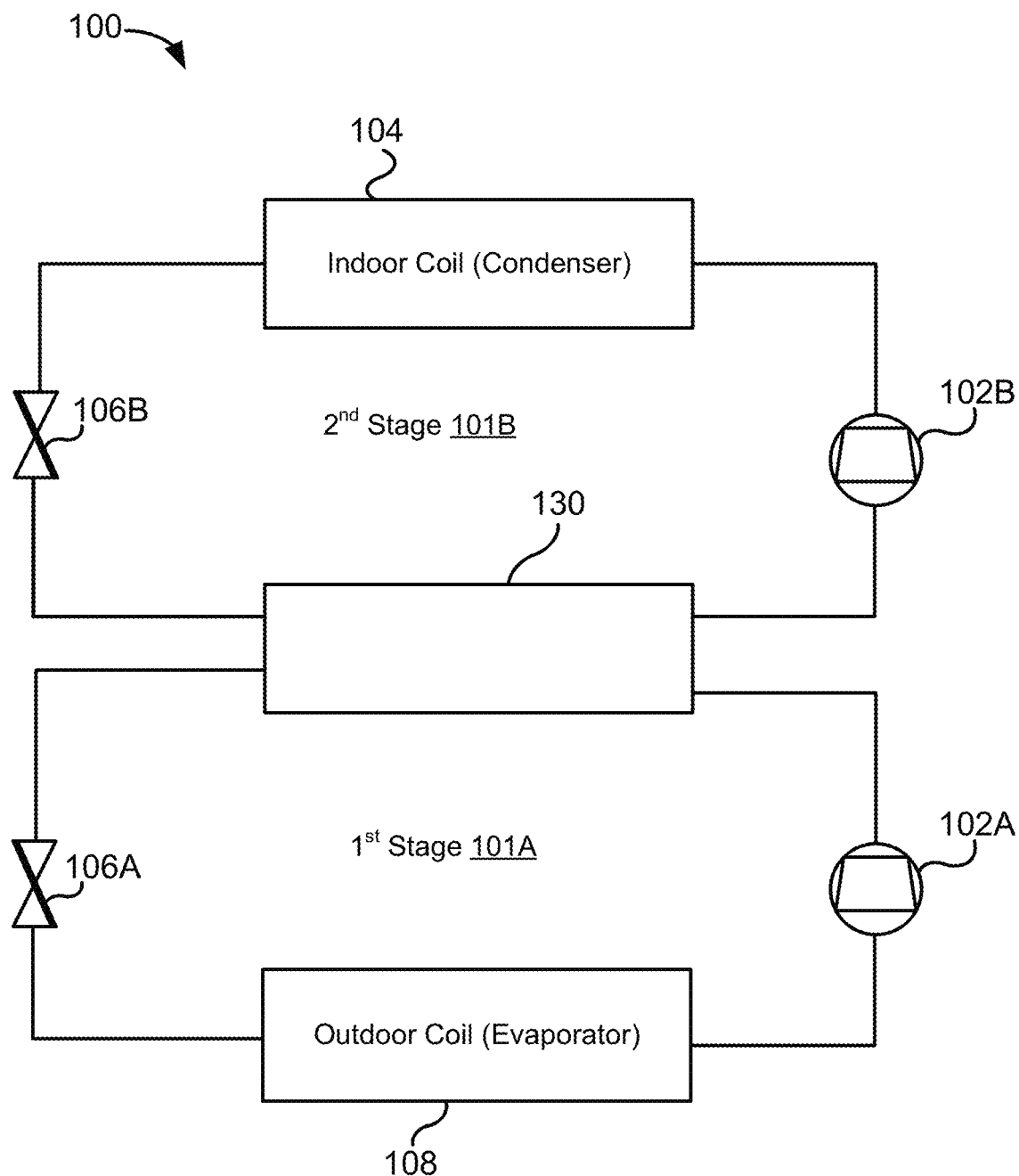
FIG. 1 illustrates an existing cascade heat pump system.

The disclosed technology includes heat pump systems that can be configured to operate in both cool and warm climates. For example, the disclosed technology includes a heat pump system having a heat exchanger configured to facilitate heat exchange between a refrigerant and a thermal energy storage (TES) material. The TES material can store thermal energy (also referred to as heat energy) transferred to the TES material from the refrigerant when a heat demand is low. The TES material can also transfer the stored thermal energy to the refrigerant when heating is required. In this way, the disclosed heat pump can be configured to heat a building in cooler climates without requiring two compressors to operate in a cascade configuration thereby reducing the amount of energy consumed by the heat pump. Furthermore, the disclosed technology can include a multi-fluid heat exchanger to facilitate heat transfer between the TES material and at least refrigerant in a first fluid path and refrigerant in a second fluid path to enable heat to be transferred both to and from the TES material. As will become apparent throughout this disclosure, the disclosed technology can increase the overall efficiency of the heat pump by utilizing the benefits of the TES material and by operating the heat pump in the various configurations described herein.

Although various aspects of the disclosed technology are explained in detail herein, it is to be understood that other aspects of the disclosed technology are contemplated. Accordingly, it is not intended that the disclosed technology is limited in its scope to the details of construction and arrangement of components expressly set forth in the following description or illustrated in the drawings. The disclosed technology can be implemented and practiced or carried out in various ways. In particular, the presently disclosed subject matter is described in the context of being systems and methods for use with a heat pump system for heating and cooling a building or other climate-controlled space. The present disclosure, however, is not so limited, and can be applicable in other contexts. The present disclosure can, for example, include devices and systems for use with heat pump water heating systems, refrigeration systems, air-source space heating heat pump systems (including both split and packaged systems), automotive cabin heating and cooling systems, ground-source heat pump systems, and other similar heat pump systems and air conditioning systems. Accordingly, when the present disclosure is described in the context of a heat pump system for heating or cooling a building, it will be understood that other implementations can take the place of those referred to.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the disclosed technology, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the disclosed technology can include from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the methods and processes described herein. That is, the disclosed technology includes methods that omit one or more steps expressly discussed with respect to the methods described herein.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, similar components that are developed after development of the presently disclosed subject matter.

To facilitate an understanding of the disclosed technology, the appended drawings have been arranged in an order best suited for describing the disclosed technology. In particular, the drawings have been arranged to first explain the components and the various modes of operation of the heat pump 200 (FIGS. 2A-2I), then to describe various multi-fluid heat exchangers 300A-300C that can be used in conjunction with the heat pump 200 (FIGS. 3A-3C), then to describe a controller 440 that can be used to control the heat pump 200 (FIG. 4), then a flow chart illustrating various methods of controlling the heat pump 200 is described (FIG. 5), and finally charts illustrating the capacity (FIG. 6A) and coefficient of performance (FIG. 6B) of the heat pump 200 in various ambient temperatures are described. The various drawings are generally described in the order in which they appear but reference to a particular drawing may be made when describing another drawing herein to facilitate a better understanding of the disclosed technology.

Referring now to the drawings, in which like numerals represent like elements, the present disclosure is herein described. FIG. 2 illustrates a heat pump 200 that is configured to be operated in low ambient temperature conditions. The heat pump 200, for example, can be operated in regions where the ambient temperature can remain below a freezing temperature (e.g., 32° F.) for extended periods of time. The heat pump 200 can include a first compressor 202A, a second compressor 202B, an indoor coil 204, a first expansion valve 206A, a second expansion valve 206B, a third expansion valve 206C, an outdoor coil 208, an intercooler 210, a reversing valve 212, and one or more control valves 214A-D. As will be appreciated by one of skill in the art, the first and second compressors 202A, 202B can be configured to circulate refrigerant through the indoor coil 204, the outdoor coil 208, and/or the intercooler 210 to cause the refrigerant to transfer heat from one location to another (e.g., from outside of the climate-controlled space to the inside of the climate-controlled space and vice-versa). Furthermore, as will become apparent throughout this disclosure, the heat pump 200 can be configured to store heat energy in a thermal energy storage (TES) material stored in the intercooler 210 to enable to heat pump 200 to operate in lower ambient temperature conditions than existing heat pump systems and to reduce the overall energy consumption of the heat pump 200.

To facilitate an understanding of the heat pump 200, the various components of the heat pump 200 will now be described and then the operation of the heat pump 200 as illustrated in FIGS. 2A-2I will be described.

The compressors 202A, 202B can be configured to circulate the refrigerant through the heat pump 200 simultaneously or independently depending on the configuration and the various system conditions. The compressors 202A, 202B can be any type of compressor. For example, the compressors 202A, 202B can each be a positive displacement compressor, a reciprocating compressor, a rotary screw compressor, a rotary vane compressor, a rolling piston compressor, a scroll compressor, an inverter compressor, a diaphragm compressor, a dynamic compressor, an axial compressor, or any other form of compressor that can be integrated into the heat pump 200 for the particular application. The compressors 202A, 202B can be a fixed speed or a variable speed compressor depending on the application. Furthermore, the compressors 202A, 202B can both be the same type of compressor or each be a different type of compressor depending on the application.

The indoor coil 204 and the outdoor coil 208 can be or include any type of heat exchanger configured to facilitate heat transfer between fluids. The fluid, for example, can be refrigerant, air, water, glycol, dielectric fluids, or any other type of fluid suitable for the particular application. In the examples shown and described in relation to FIGS. 2A-2I, the indoor coil 204 and the outdoor coil 208 can be configured to exchange heat between refrigerant in the heat pump 200 and air. For example, the indoor coil 204 can be configured to exchange heat between the refrigerant and air that is circulated through the climate-controlled space and the outdoor coil 208 can be configured to exchange heat between the refrigerant and air outside of the climate-controlled space. As will be appreciated by one of skill in the art, the indoor coil 204 and the outdoor coil 208 can each be configured to operate as either an evaporator or a condenser depending on the particular application and the direction of the refrigerant flow through the heat pump 200. The indoor coil 204 and the outdoor coil 208 can be or include, for example, a shell and tube heat exchanger, a double pipe heat exchanger, a plate heat exchanger, microchannel heat exchanger, or any other suitable heat exchanger for the application.

Figure 3A:
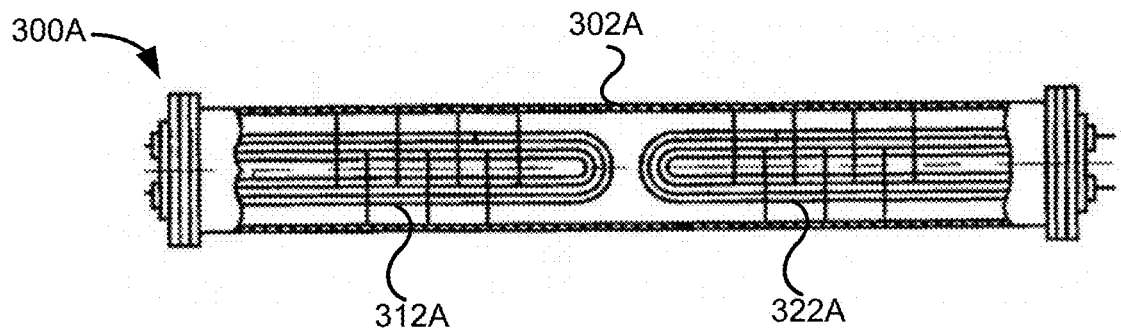
FIG. 3A-3C illustrate example multi-fluid heat exchangers, in accordance with the disclosed technology.
Figure 3B:
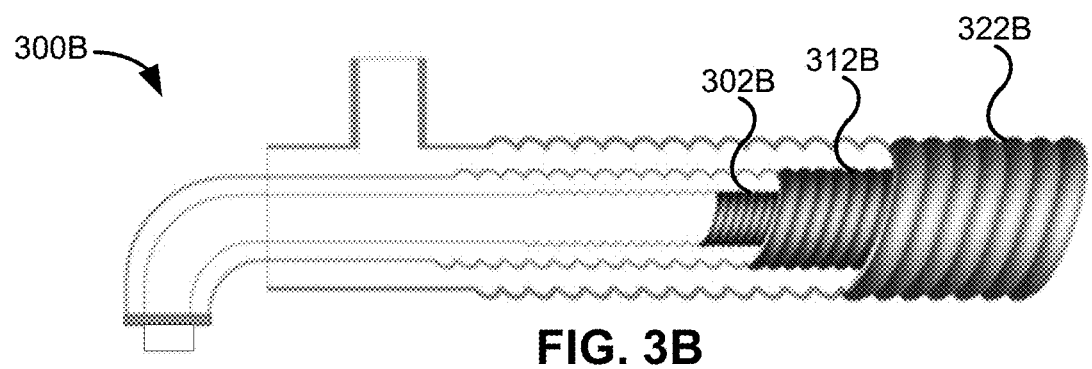
Figure 3C:
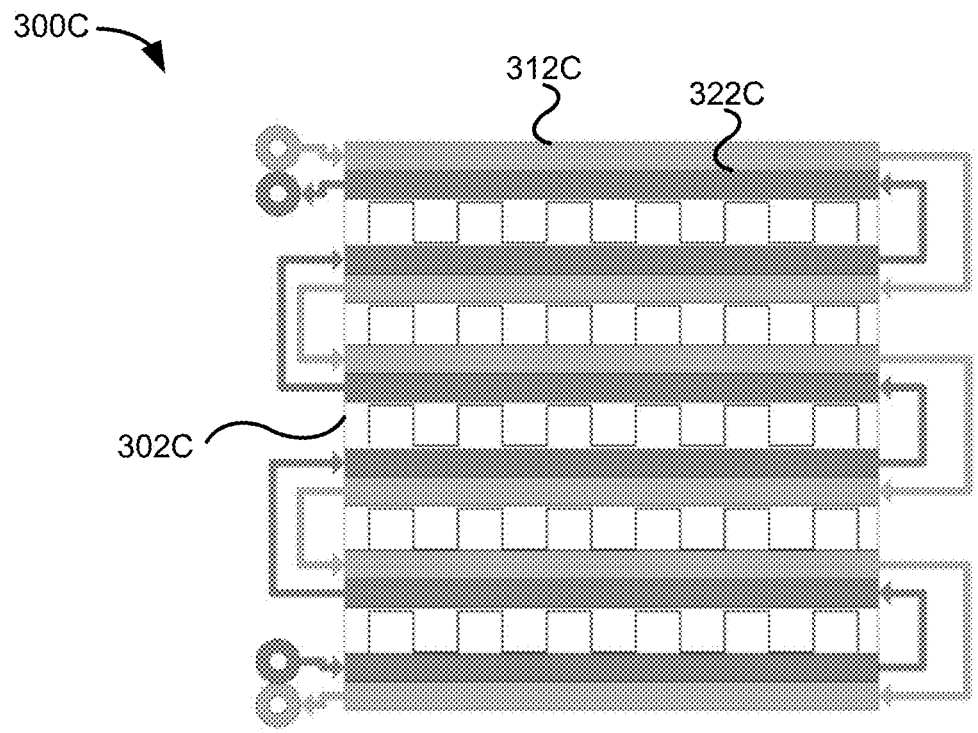

The intercooler 210 can be a multi-fluid heat exchanger that can have a TES material configured to store thermal energy. The TES material, for example, can be positioned in the intercooler 210 such that the TES material can exchange thermal energy with refrigerant in a first refrigerant path and refrigerant in a second refrigerant path with both the first and second refrigerant paths passing through the intercooler 210 (or otherwise in thermal communication with the TES material). The first refrigerant path can be a fluid flow path that is at least between the first compressor 202A and the outdoor coil 208. The second refrigerant path can be a fluid flow path that is at least between the second compressor 202B and the indoor coil 204. FIGS. 3A-3C illustrate various examples of the intercooler 210 being a multi-fluid heat exchanger. Specifically, FIG. 3A illustrates a shell and tube heat exchanger 300A having a shell 302A and two tube bundles (i.e., 322A and 322B), FIG. 3B illustrates a tube-in-tube heat exchanger 300B having three tubes (i.e., 302B, 312B, and 322B), and FIG. 3C illustrates a microchannel heat exchanger 300C having two microchannel tubes (i.e., 312C, 322C) and plates 302C.

The intercooler 210 can permit heat transfer between refrigerant in at least two refrigerant paths and a TES material. For example, the intercooler 210 can include a first passage configured to allow the refrigerant to pass through the intercooler 210 in a first refrigerant path, a second passage configured to allow the refrigerant to pass through the intercooler 210 in a second refrigerant path, and the intercooler 210 can have a TES material that can be in thermal communication with both the first passage and the second passage to facilitate heat transfer between the refrigerant and the TES material. As will be appreciated by one of skill in the art, heat will pass from a fluid having a higher temperature to a fluid having a lower temperature. To illustrate, heated refrigerant directed from the outdoor coil 208 through the first passage in the first refrigerant path can transfer heat to the TES material if the TES material is cooler than the refrigerant from the outdoor coil 208. Similarly, if the TES material is warmer than the refrigerant directed to the indoor coil 204 through the second passage in the second refrigerant path, thermal energy can be passed from the TES material to the refrigerant directed to the indoor coil 204. As will be appreciated, the heat energy directed to the indoor coil 204 can then be transferred via the indoor coil 204 to air circulated through a building to heat the building.

Turning to FIG. 3A, the intercooler 210 can be a shell and tube heat exchanger 300A having a shell 302A, a first tube bundle 312A, and a second tube bundle 322A. The shell 302A can house the TES material, the first tube bundle 312A can be or include the first refrigerant path, and the second tube bundle 322A can be or include the second refrigerant path. In this way, the TES material can be configured to exchange thermal energy between the refrigerant in the first refrigerant path as well as the refrigerant in the second refrigerant path. The tube bundles (i.e., first tube bundle 312A and second tube bundle 322A) can be arranged to overlap and span the entire length of the shell 302A to allow for each tube bundle 312A, 322A to be in full contact with the entire TES material in the shell 302A and allow for better heat exchange.

The tube-in-tube heat exchanger 300B illustrated in FIG. 3B can include a first tube 302B that can be positioned at least partially within a second tube 312B and the second tube 312B can be at least partially positioned within a third tube 322B. The first tube 302B can be or include the first refrigerant path, the second tube 312B can be configured to house the TES material, and the third tube 322B can be or include the second refrigerant path. In this way, the TES material can be configured to exchange thermal energy between the refrigerant in the first refrigerant path as well as the refrigerant in the second refrigerant path.

As illustrated in FIG. 3C, the intercooler 210 can be a microchannel heat exchanger 300C having a first microchannel tube 312C, a second microchannel tube 322C, and plates 302C. The plates 302C can include fins that are offset to further help facilitate heat transfer. The first microchannel tube 312C can be or include the first refrigerant path, the second microchannel tube 322C can be or include the second refrigerant path, and the plates can house the TES material. In this way, the TES material can be configured to exchange thermal energy between the refrigerant in the first refrigerant path as well as the refrigerant in the second refrigerant path. The first microchannel tube 312C and the second microchannel tube 322C can each be configured to pass multiple times through the microchannel heat exchanger 300C to facilitate heat transfer. Furthermore, the plates 302C can be configured such that the TES material can be circulated through the microchannel heat exchanger 300C (e.g., into and out of the page with each row of plates 302C).

The TES material used in the intercooler 210 can be any type of TES material suitable for the particular application. The TES materials, for example, can be a phase change material configured to change phases as thermal energy is added or removed from the TES material. The TES material can be organic or inorganic materials such as salt hydrates, paraffins, fatty acids, hydrogels, water, glycol, or any other suitable type of TES material for the application.

The expansion valves 206A-C can be any type of expansion valve suitable for the application. For example, and not limitation, the expansion valves 206A-C can be a thermal expansion valve, a manual valve, a capillary tube, an electronic expansion valve, an automatic expansion valve, a float valve, or any other suitable type of expansion valve. Furthermore, the expansion valves 206A-C can be positioned to facilitate expansion of the refrigerant as it is circulated through the heat pump 200. For example, a first expansion valve 206A can be positioned in a fluid flow path upstream of the outdoor coil 208 (when the heat pump 200 is in a heating mode), a second expansion valve 206B can be positioned in a fluid flow path upstream of the intercooler 210 (when the heat pump 200 is in a heating mode), and a third expansion valve 206C can be positioned in a fluid flow path upstream of the indoor coil 204 (when the heat pump 200 is in a cooling mode). Furthermore, as will be appreciated by one of skill in the art, the expansion valves 206A-C can include one or more check valves to allow the refrigerant to circulate through the expansion valves 206A-C in a reverse direction depending on the mode of operation of the heat pump 200.

Figure 4:
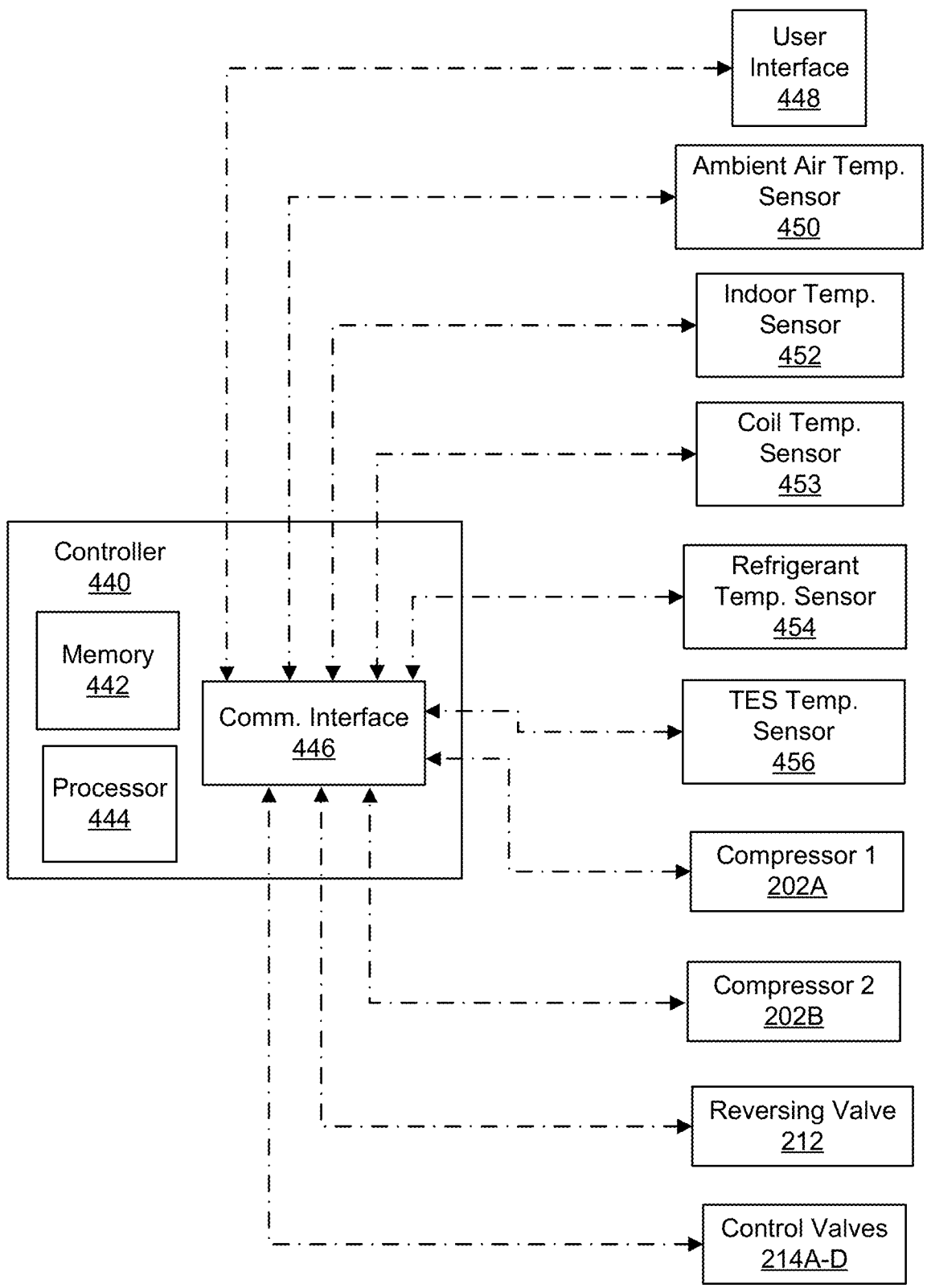
FIG. 4 illustrates a schematic diagram of a controller and various components of the heat pump system, in accordance with the disclosed technology.

The heat pump 200 can include a reversing valve 212 to help control a flow direction of the refrigerant through the heat pump 200. As will be appreciated, the reversing valve 212 can be positioned in a fluid flow path downstream of the compressor 202A and be configured to cause the heat pump 200 to either operate in a heating mode or a cooling mode depending on the position of the reversing valve 212. The reversing valve 212 can be any type of valve suitable for the application. For example, the reversing valve 212 can be a poppet-type or a slide-type reversing valve and a position of the reversing valve can be manually controlled, electronically controlled, pneumatically controlled, and/or hydraulically controlled. As will be described in greater detail herein, the reversing valve 212 can be controlled by a controller 440 as illustrated in FIG. 4. Furthermore, as shown in FIGS. 2B, 2H, and 2I, the heat pump 200 can include a second reversing valve 212B that can be positioned in a fluid flow path downstream of the second compressor 202B and upstream of the second control valve 214B to facilitate circulating refrigerant in a reverse direction through the indoor coil 204 and the intercooler 210. By including a second reversing valve 212B, the heat pump 200, for example, can be configured to provide cooling by facilitating heat transfer between the TES material and the refrigerant circulated through the indoor coil 204 to cool the building.

To further help control the flow of the refrigerant through the heat pump 200, the heat pump 200 can include one or more control valves 214A-D that can be configured to direct refrigerant to various parts of the heat pump 200. For example, the control valves 214A-D can be positioned such that the control valves 214A-D can direct the refrigerant through the indoor coil 204, through the outdoor coil 208, through the intercooler 210, or a combination of the indoor coil 204, the outdoor coil 208, and the intercooler 210. The control valves 214A-D can be any type of valve suitable for the application. For example, the control valves 214A-D can be a ball valve, a plug valve, a butterfly valve, a gate valve, a globe valve, a needle valve, a coaxial valve, an angle seat valve, a three-way valve, or any other type of valve that would be suitable for the particular application. Furthermore, the control valves 214A-D can be configured to be controlled by any suitable method, including manually controlled, electronically controlled, pneumatically controlled, and/or hydraulically controlled. The control valves 214A-D can be positioned such that the control valves 214A-D can control a flow of the refrigerant. As a non-limiting example, and as illustrated in FIGS. 2A-2I, a control first valve 214A can be positioned in a fluid flow path between the first compressor 202A, the intercooler 210, and the indoor coil 204. Furthermore, a second control valve 214B can be positioned in a fluid flow path between the second compressor 214B and the indoor coil 204, a third control valve 214C can be positioned in a fluid flow path between the indoor coil 204 and the intercooler 210, and a fourth control valve 214D can be positioned in a fluid flow path between the indoor coil 204, the intercooler 210, and the outdoor coil 208. As will be described in greater detail herein, the control valves 214A-D can be controlled by a controller 440 as illustrated in FIG. 4.

As illustrated in FIGS. 2A-2I, the heat pump 200 can be configured to operate in several different modes to facilitate heating and cooling of a building or other climate-controlled space as well as charging the TES material and defrosting the outdoor coil 208. Several modes of operation will now be described as illustrated in each of FIGS. 2A-2I. It will be appreciated, however, that the various modes illustrated in FIGS. 2A-2I and described herein are not exhaustive and the heat pump 200 can be configured to operate in other modes and/or configurations consistent with the disclosed technology that are not shown in FIGS. 2A-2I. As illustrated in each of FIGS. 2A-2I, refrigerant lines connecting the various components which are denoted by a solid line indicate direction of refrigerant flow while refrigerant lines having dashed lines indicate no refrigerant flow through the particular refrigerant line in the illustrated configuration.

Figure 2A:
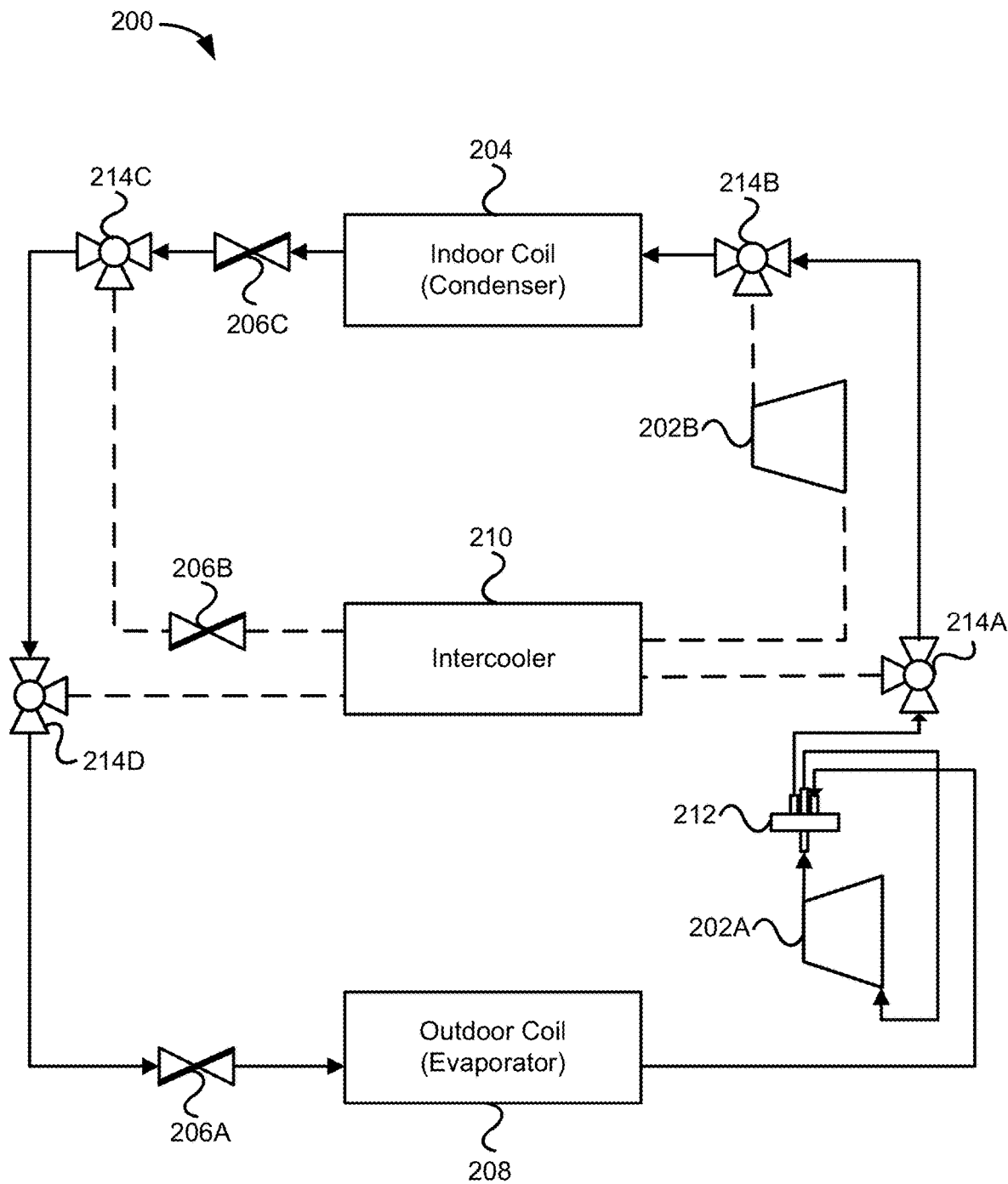
FIG. 2A illustrates a schematic diagram of a heat pump system in a heating mode, in accordance with the disclosed technology.
Figure 2B:
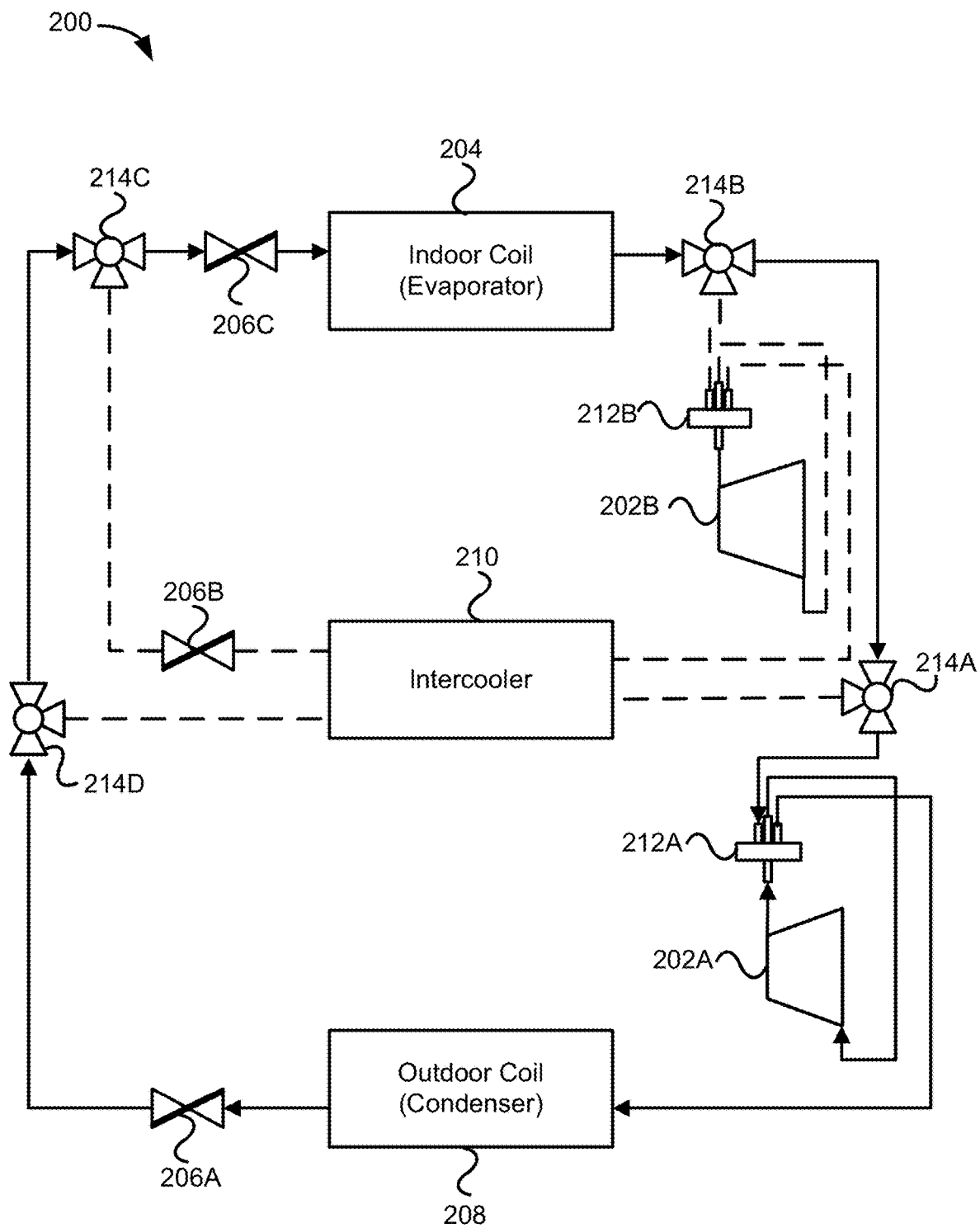
FIG. 2B illustrates a schematic diagram of a heat pump system in a cooling mode, in accordance with the disclosed technology.

As illustrated in FIG. 2A, the heat pump 200 can be configured to operate in a simple heating mode to provide heat to a climate-controlled space. In the heating mode illustrated in FIG. 2A, the heat pump 200 can be configured to actuate one or more of control valves 214A-D to cause refrigerant to circulate from the outdoor coil 208 to the indoor coil 204 via the first compressor 202A. In this way, the heat pump 200 can transfer heat from the ambient air via the outdoor coil 208 to the indoor coil 204 by operating only the first compressor 202A to heat air circulated through the climate-controlled space. The heat pump 200 can be configured to operate in this simple heating mode, for example, when the ambient air temperature is greater than a low ambient temperature threshold. The low ambient temperature threshold can be a threshold temperature at which the heat pump 200 begins to be unable to efficiently transfer heat from ambient air to air circulated through the climate-controlled space with the first compressor 202A alone. As will be appreciated, as the temperature of the ambient air begins to decrease, less heat energy is available for the heat pump 200 to transfer from the ambient air to the indoor air via the outdoor coil 208 and the indoor coil 204. Thus, the heat pump 200 can operate with a single compressor in conditions where the ambient air comprises sufficient heat energy to heat the building with just the first compressor 202A (i.e., the ambient air temperature is greater than the low ambient temperature threshold). In this way, the heat pump 200 can help to reduce the overall energy consumed by the heat pump 200 because there is no need to operate both the first compressor 202A and the second compressor 202B simultaneously in these conditions. Stated otherwise, the low ambient temperature threshold can be a temperature that is associated with a minimum energy efficiency of the heat pump 200. When the ambient temperature is above the low ambient temperature threshold and heat is demanded in the conditioned space, it can be determined that the energy efficiency of the heat pump 200 is maximized if the heat pump 200 operates in simple heating mode (as compared to other operational modes of the heat pump 200, as will be described more fully herein).

FIG. 2B illustrates the heat pump 200 in a simple cooling mode. As illustrated in FIG. 2B, the heat pump 200 can include a second reversing valve 212B and the reversing valve 212 can be a first reversing valve. Although omitted from FIGS. 2A and 2C-2G for simplification of explanation, it will be appreciated that the heat pump 200 can include a second reversing valve 212B, as illustrated in FIG. 2B, to reverse a direction of the refrigerant flow through the indoor coil 204 and the intercooler 210 (e.g., if it desired for the heat pump 200 to selectively cool the conditioned space). Although, not shown in every figures, it will be appreciated that the second reversing valve 212B can be included in any of the heat pumps 200 illustrated in FIGS. 2A-2I.

The heat pump 200 can be configured to actuate the first reversing valve 212A (and/or the second reversing valve 212B, if present) to cause the heat pump 200 to move heat energy from a climate-controlled space to the ambient air. In this way, the heat pump 200 can reduce a temperature of the air circulated through the climate-controlled space to therefore cool the building. The heat pump 200, for example, can be configured to operate in the simple cooling mode illustrated in FIG. 2B when an indoor temperature of the climate-controlled space is greater than an indoor threshold temperature (i.e., a target temperature). As non-limiting examples, the indoor threshold temperature can be a temperature selected by an occupant of the climate-controlled space or the threshold temperature can be a preprogrammed temperature setting. As the temperature inside of the climate-controlled space rises above the indoor threshold temperature, the heat pump 200 can determine that the climate-controlled space should be cooled and output a control signal to operate the heat pump 200 in the simple cooling mode as shown in FIG. 2B. Furthermore, as will be appreciated by one of skill in the art, the heat pump 200 can be configured to provided cooling without having the second reversing valve 212B (similar to the configuration shown in FIG. 2A).

Figure 2C:
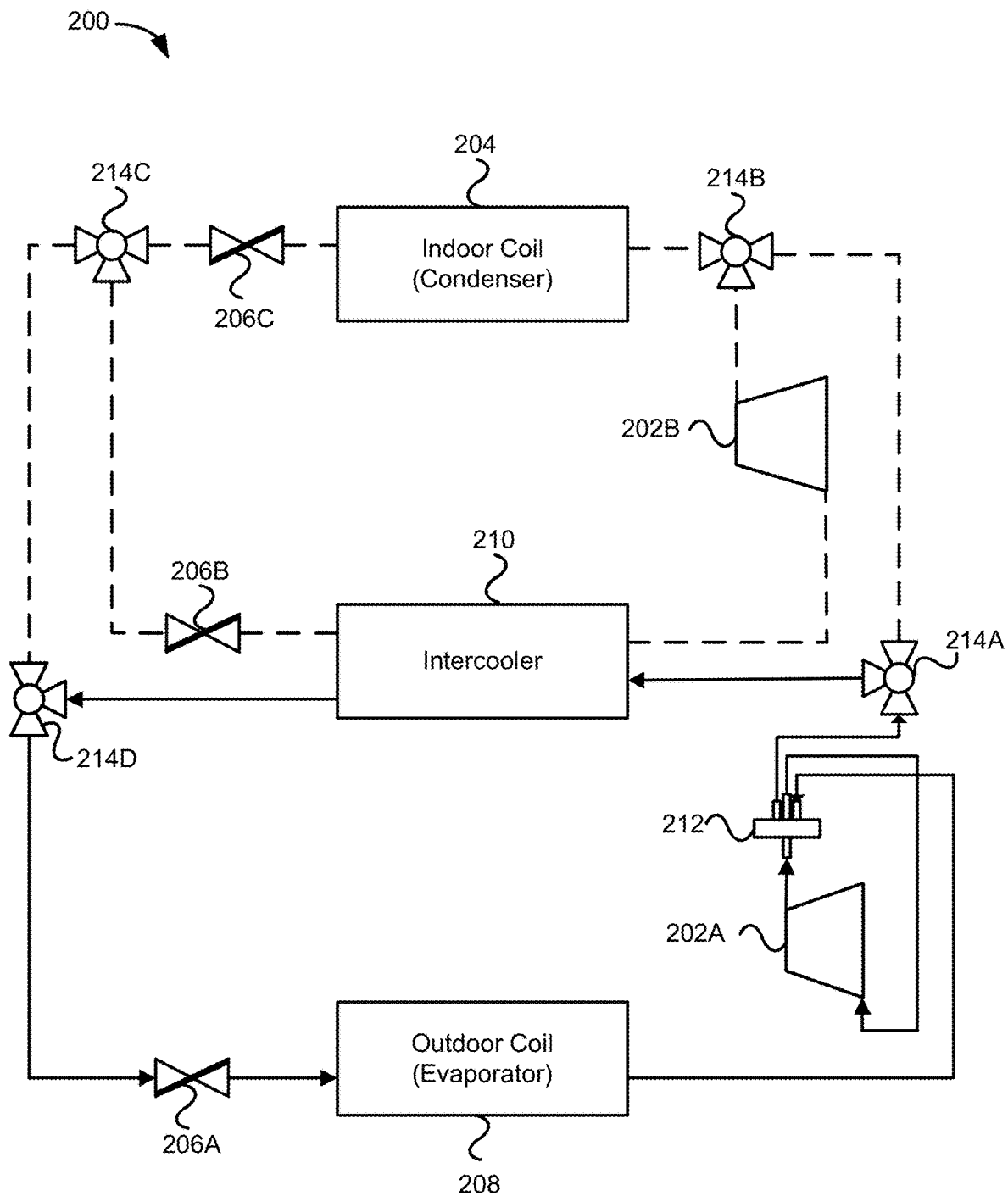
FIG. 2C illustrates a schematic diagram of a heat pump system in a TES charging mode, in accordance with the disclosed technology.

FIG. 2C illustrates the heat pump 200 in a TES charging mode. The TES charging mode can be, for example, a mode in which the climate-controlled space does not require heating or cooling but the TES temperature is less than a TES temperature threshold. The TES temperature threshold can be a temperature at which the TES material has depleted much of its stored thermal energy and the heat pump 200 can be configured to add heat energy ("charge") the TES material by transferring heat energy from the ambient air to the TES material. When in TES charging mode, the heat pump 200 can direct refrigerant through the compressor 202A, the intercooler 210, the first expansion valve 206A, and/or the outdoor coil 208. As will be appreciated, as thermal energy is drawn from the TES material, the temperature of the TES material may decrease and/or the TES material (in many cases) will change phases (e.g., from a gas to a liquid, from a liquid to a solid, etc.). In some examples, when the heat pump 200 detects that the temperature of the TES material has decreased to below the TES temperature threshold, the heat pump 200 can output one or more control signals to cause the refrigerant to circulate through the intercooler 210 and the outdoor coil 208 but not through the indoor coil 204. In this way, the heat pump 200 can add heat energy to the TES material in the intercooler 210 for later use.

Figure 2D:
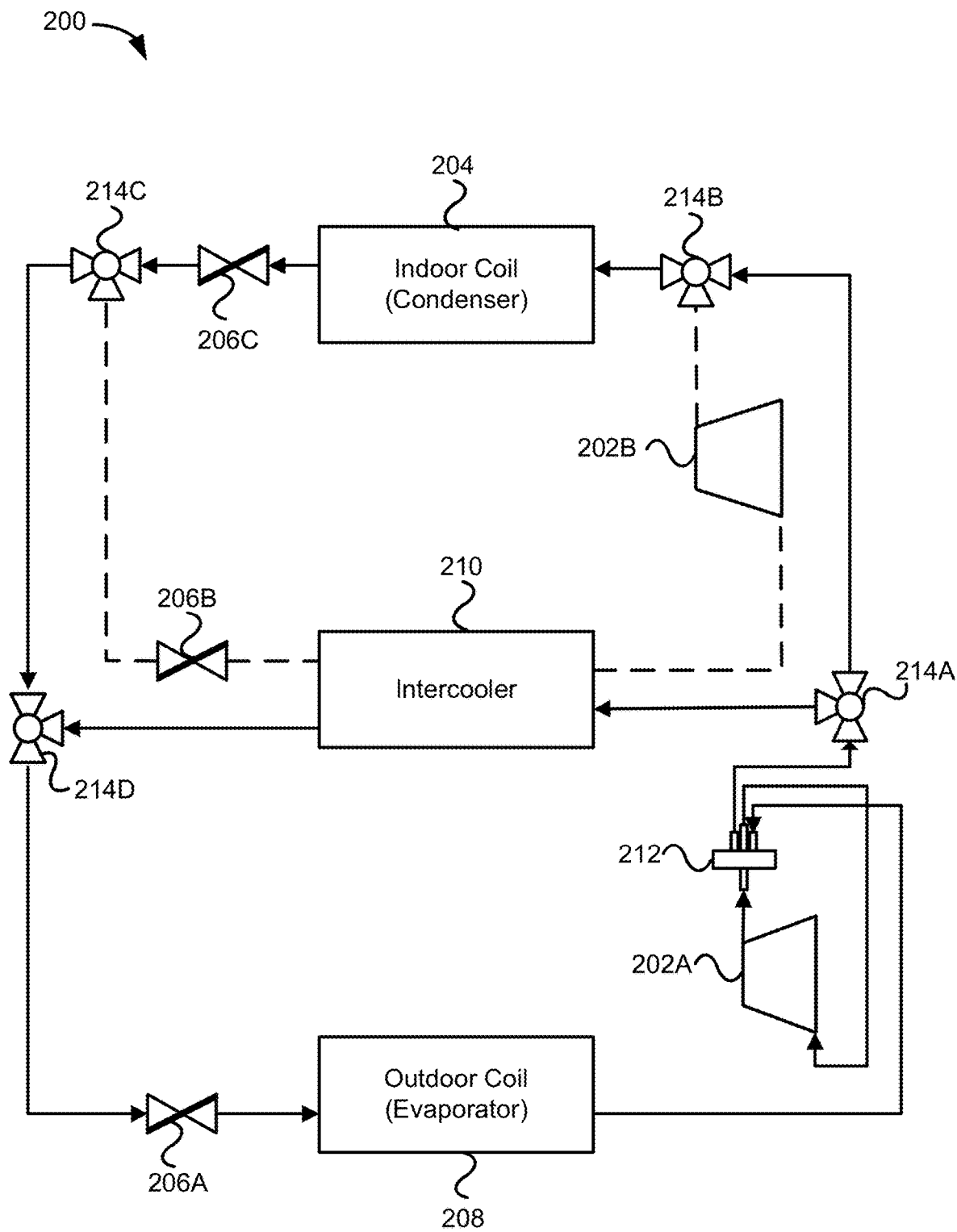
FIG. 2D illustrates a schematic diagram of a heat pump system in a combined TES charging and heating mode, in accordance with the disclosed technology.

FIG. 2D illustrates the heat pump 200 in a TES charging and heating mode. The TES charging and heating mode can be activated when, for example, the heat pump 200 determines that the temperature of the air in the climate-controlled space is less than the indoor threshold temperature, the ambient temperature is greater than the ambient threshold temperature, and the TES temperature is less than the TES threshold temperature. The heat pump 200 can then actuate one or more of the control valves 214A-D and activate the first compressor 202A to cause refrigerant to circulate through the outdoor coil 208 and through both the intercooler 210 and the indoor coil 204. Stated otherwise, when the heat pump 200 is in TES charging and heating mode, the first compressor 202A can be configured to simultaneously direct refrigerant toward both the intercooler 210 and the indoor coil 204. As will be appreciated, the TES charging and heating mode can be utilized when, for example, the climate-controlled space must be heated but the load demand does not require all of the heat energy to be directed to the climate-controlled space (e.g., at least some of the heat energy can be directed to the TES material to be stored for later use). In this way, the heat pump 200 can both heat the climate-controlled space and add thermal energy to the TES material for later use.

Figure 2E:
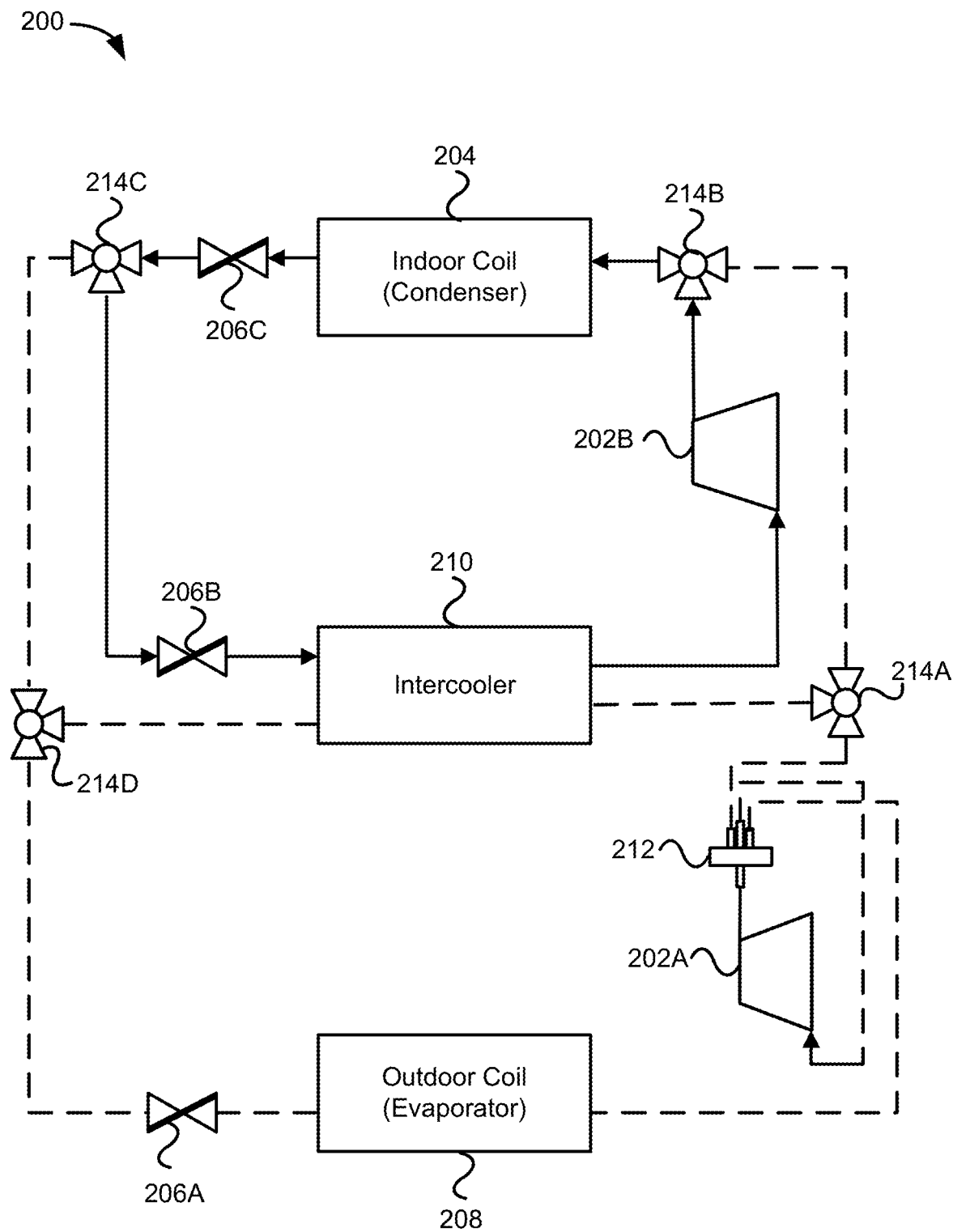
FIG. 2E illustrates a schematic diagram of a heat pump system in a heating mode with TES discharge, in accordance with the disclosed technology.

FIG. 2E illustrates the heat pump 200 in a space heating and TES discharging mode. The space heating and TES discharging mode can be activated, for example, when the heat pump 200 determines that the indoor temperature is less than the indoor threshold temperature, the ambient air temperature is less than the ambient air threshold temperature, and the TES temperature is greater than the TES threshold temperature. In other words, the space heating and TES discharging mode can be activated when the climate-controlled space requires heating and the ambient air temperature is too low to efficiently transfer heat from the outdoor coil 208 but the TES has sufficient thermal energy to provide heating. In this way, the heat pump 200 can effectively utilize stored thermal energy from the TES material to heat the climate-controlled space. Specifically, when the heat pump 200 is in space heating and TES discharging mode, the second compressor 202B can be configured to direct refrigerant through the indoor coil 204 and the intercooler 210.

Figure 2F:
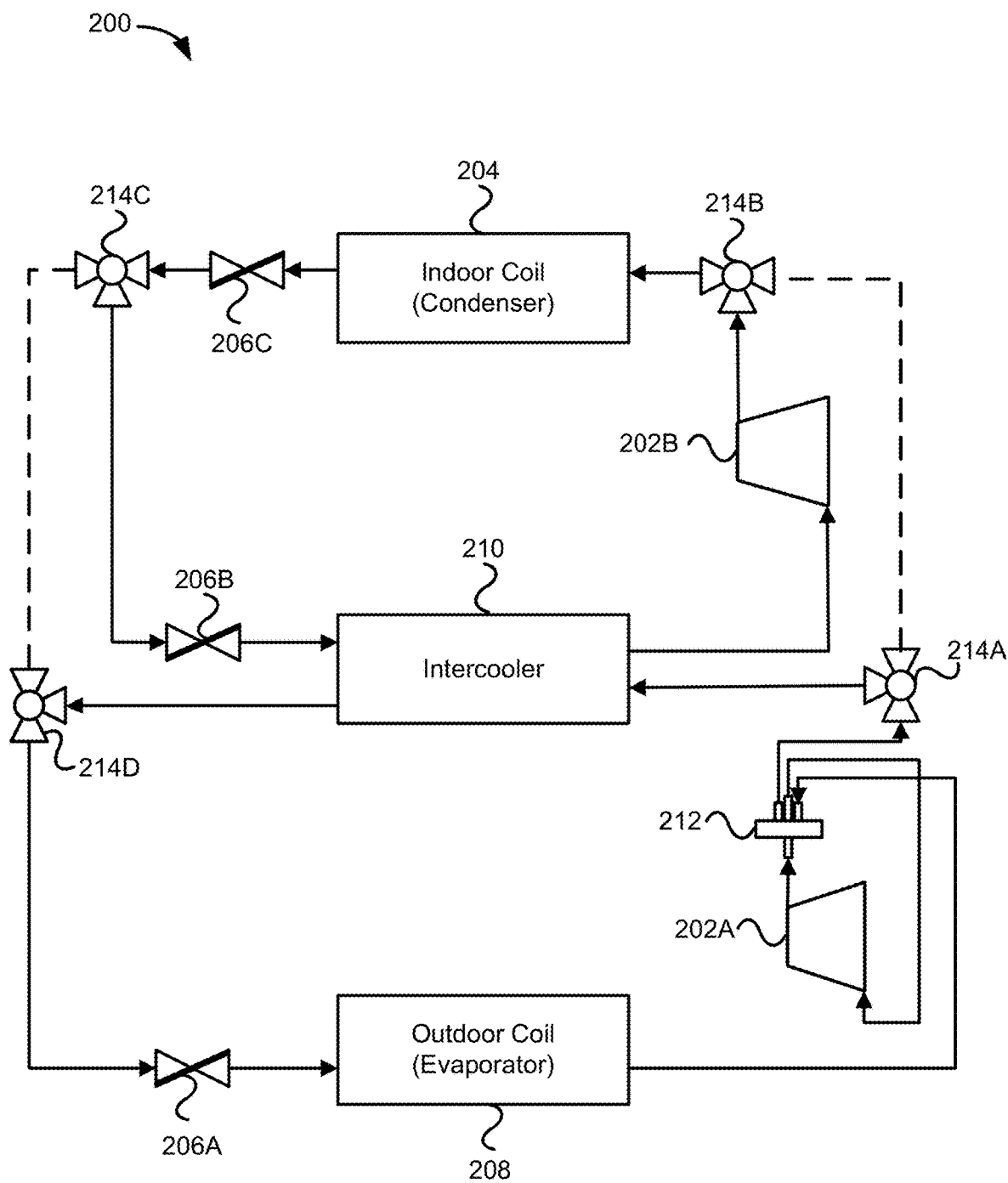
FIG. 2F illustrates a schematic diagram of a heat pump system in a cascade heating mode, in accordance with the disclosed technology.

As will be appreciated, if the heat pump 200 continues to heat the climate-controlled space using only the stored thermal energy in the TES material (i.e., as illustrated and described in relation to FIG. 2E) for a long enough period, the stored thermal energy will eventually be depleted. If the indoor temperate remains below the indoor threshold temperature, the ambient air temperature is less than the ambient air threshold temperature, and/or the TES temperature is less than the TES threshold temperature (e.g., the thermal energy in the TES material has depleted), the heat pump 200 can activate a cascade heating mode as illustrated in FIG. 2F. In the cascade heating mode, the heat pump 200 can output one or more control signals to actuate control valves 214A-D and activate the first compressor 202A to cause refrigerant to circulate through the outdoor coil 208 and the intercooler 210. The heat pump 200 can also output one or more control signals to actuate the control valves 214A-D and activate the second compressor 202B to cause refrigerant to circulate through the indoor coil 204 and the intercooler 210. Stated otherwise, when the heat pump 200 is in cascade heating mode, the first compressor 202A can be configured to direct refrigerant through a first circuit including the intercooler 210 and the outdoor coil 208, and the second compressor 202B can be configured to directed refrigerant through a second circuit including the intercooler 210 and the indoor coil 204, with the first and second circuits being fluidly separate. In this way, heated refrigerant circulated by the first compressor 202A can add thermal energy to the TES material at the intercooler 210. The thermal energy stored in the TES material can then be transferred to the refrigerant circulated by the second compressor 202B at the intercooler 210 to, in turn, transfer the thermal energy to the indoor coil 204 to heat the climate-controlled space. In this way, the heat pump 200 can be configured to act much like existing cascade heat pump systems wherein two or more compressors are activated to transfer thermal energy from ambient air to indoor air to heat a climate-controlled space. In an example configuration using the multi-fluid heat exchanger 300C shown in FIG. 3C, the energy exchange can happen directly between the refrigerant circulated by the first compressor 202A and the refrigerant circulated by the second compressor 202B.

Figure 2G:
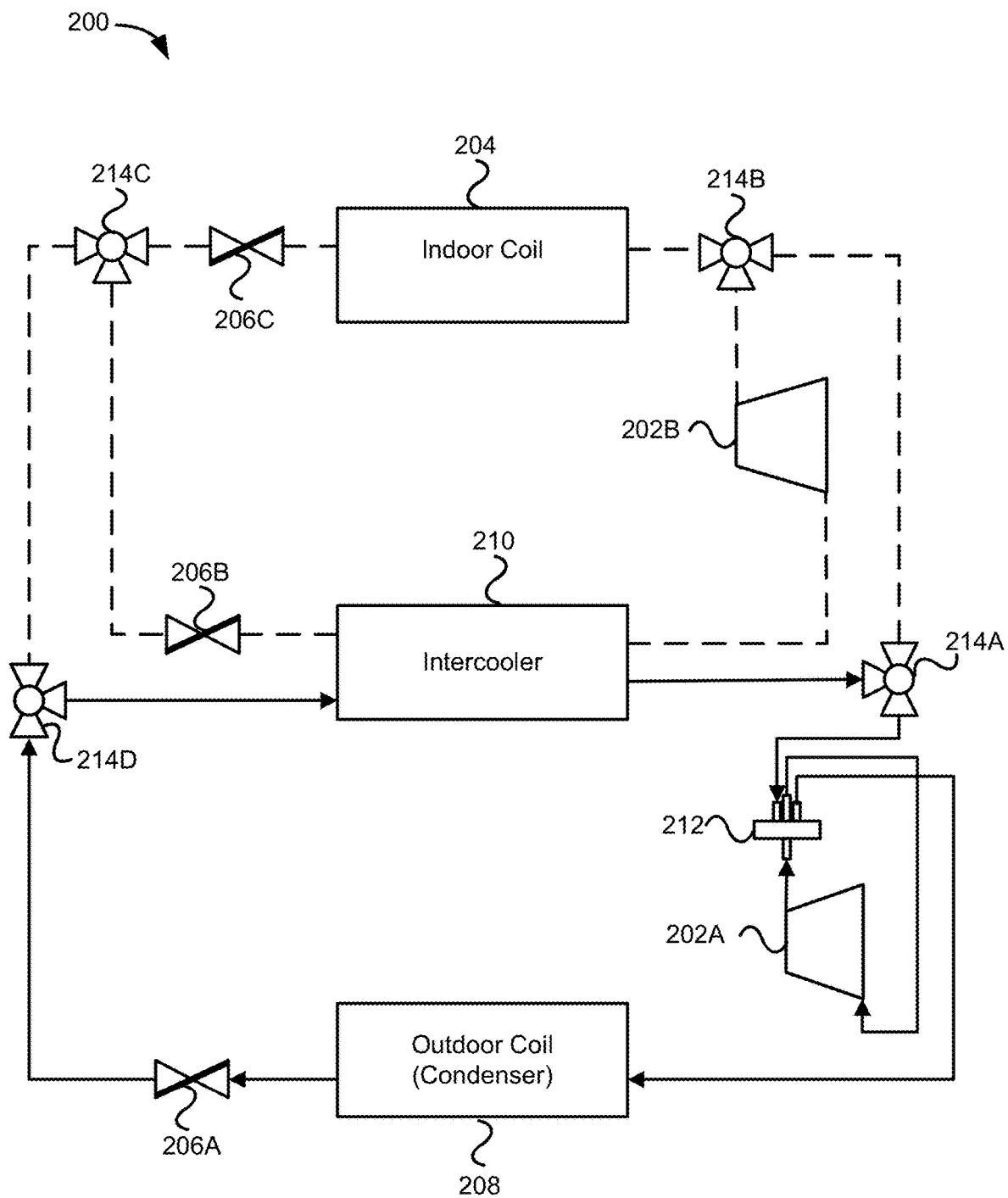
FIG. 2G illustrates a schematic diagram of a heat pump system in a defrost mode, in accordance with the disclosed technology.
Figure 2H:
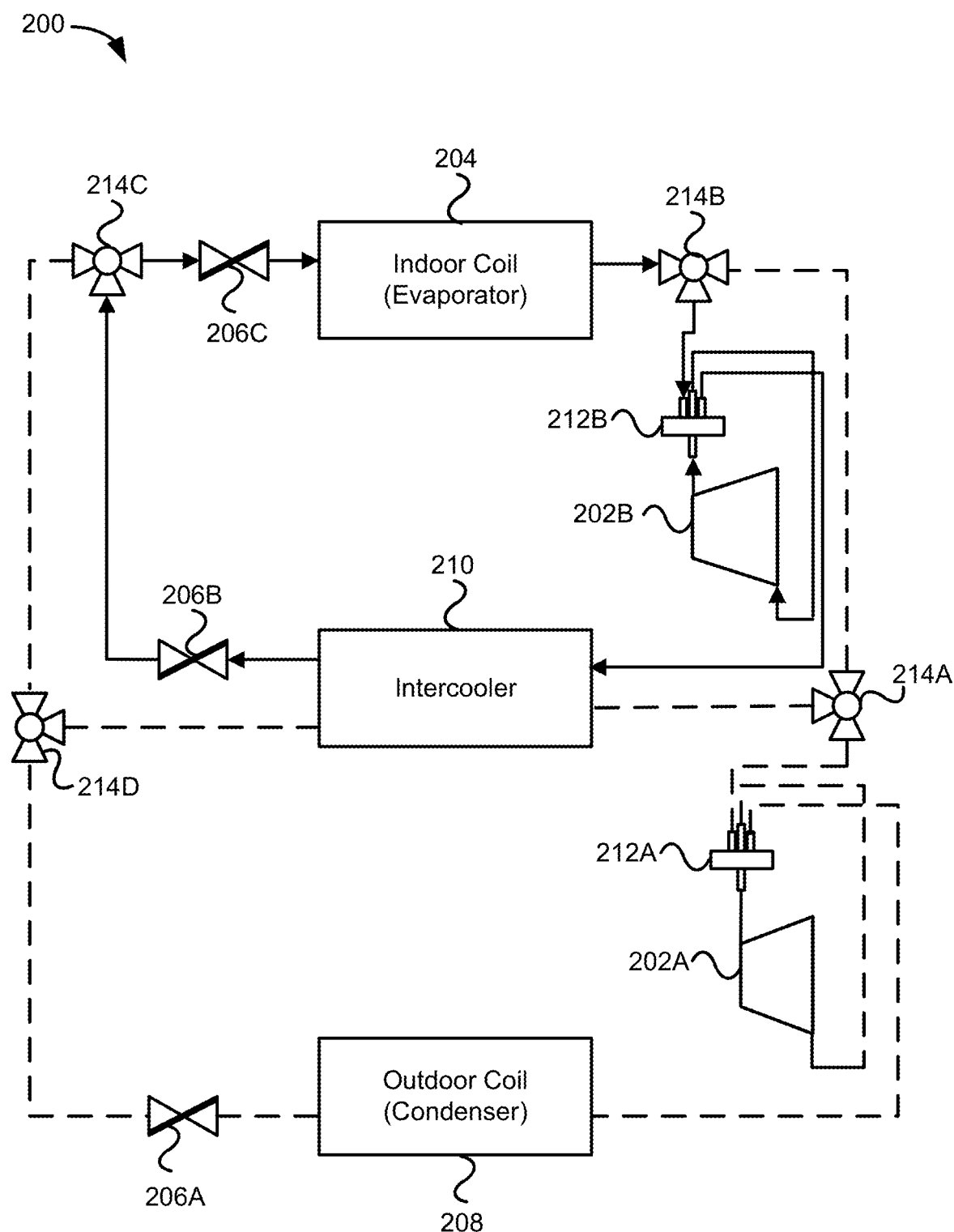
FIG. 2H illustrates another schematic diagram of a heat pump system in a cooling mode, in accordance with the disclosed technology.
Figure 2I:
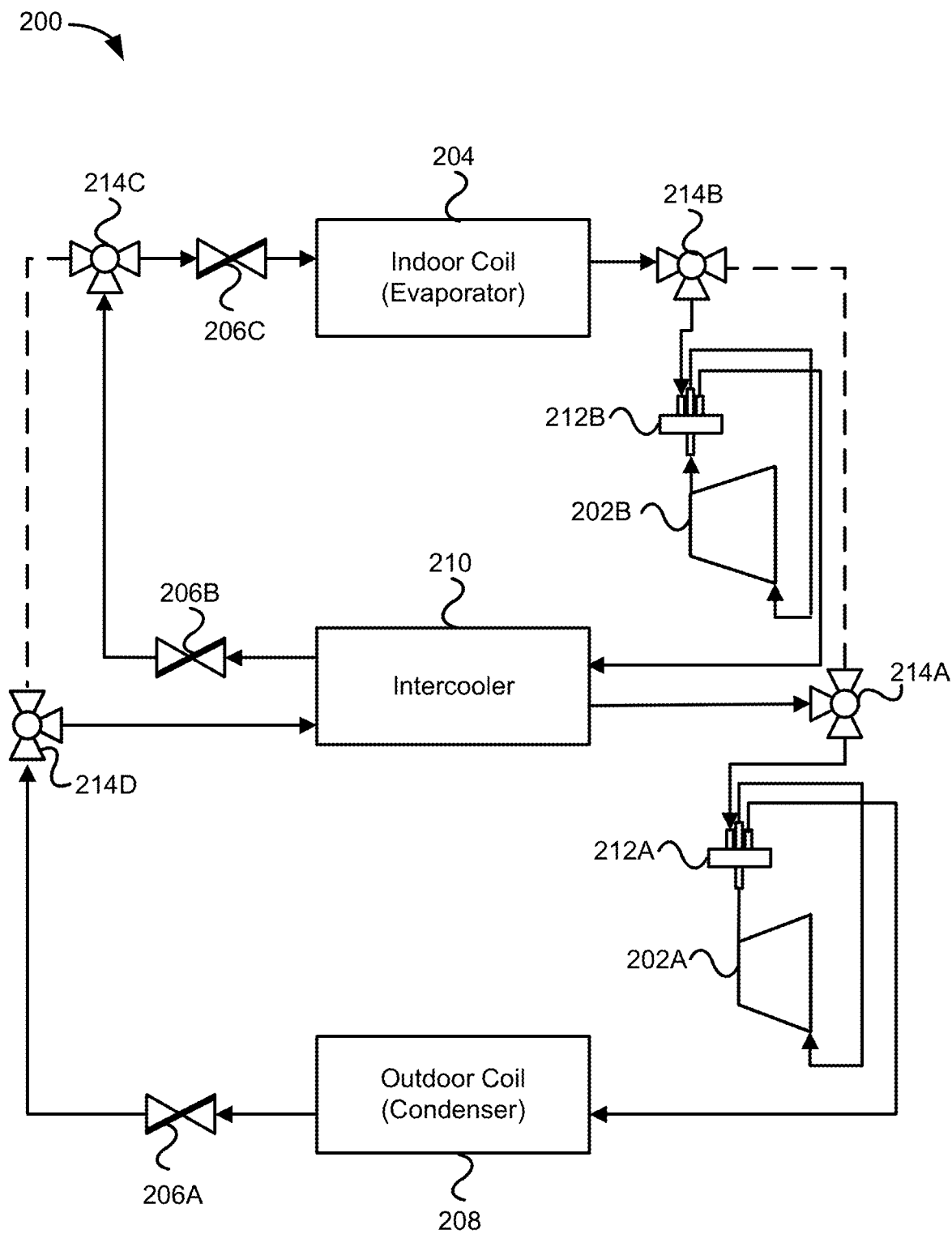
FIG. 2I illustrates a schematic diagram of a heat pump system in a cascade cooling mode, in accordance with the disclosed technology.

As illustrated in FIG. 2G, the heat pump 200 can be further configured to facilitate defrosting of the outdoor coil 208. As will be appreciated by one of skill in the art, outdoor coils of heat pumps are prone to accumulate frost when operating in a heating mode due to the outdoor coil temperature often being less than the freezing temperature of water (i.e., 32° F.). Water vapor present in the ambient air can therefore accumulate and freeze to the surface of the outdoor coil 208. As frost accumulates, the efficiency of the heat pump 200 will decrease due to the heat pump 200 being unable to efficiently transfer heat energy from the ambient air. In this scenario, the heat pump 200 can determine that the temperature of the outdoor coil 208 is less than a coil threshold temperature and output one or more control signals to actuate the control valves 214A-D, actuate the reversing valve 212, and activate the first compressor 202A to cause refrigerant to flow in a reverse direction (e.g., as compared to TES charging only mode) through the outdoor coil 208 and the intercooler 210. As will be appreciated by one of skill in the art, as refrigerant is circulated through the outdoor coil 208 in a reverse direction, the outdoor coil 208 can become a condenser and thermal energy will be released at the outdoor coil 208 to heat the outdoor coil 208 and melt accumulated frost.

As will be appreciated by one of skill in the art, the heat pump 200 may also receive data from an ambient air temperature sensor (e.g., ambient air temperature sensor 450 described herein), an indoor air temperature sensor (e.g., indoor air temperature sensor 452 described herein), a coil temperature sensor (e.g., coil temperature sensor 453 described herein), a refrigerant temperature sensor (e.g., refrigerant temperature sensor 454 described herein), a TES temperature sensor (e.g., TES temperature sensor 456 described herein), a timer, or other inputs to determine whether the outdoor coil 208 should be defrosted. As a non-limiting example, the heat pump 200 can be configured to receive outdoor ambient air temperature data from the ambient air temperature sensor 452 and determine whether the temperature of the ambient air is less than a freezing temperature of water (i.e., 32° F.), receive data from the coil temperature sensor 453 and determine whether the coil temperature is less than a threshold temperature (e.g., 30° F.), and time data from a timer. If the outdoor ambient air temperature is less than a freezing temperature of water, the coil temperature is less than the threshold temperature, and the time data indicates that a sufficient amount of time has elapsed since the last time the coil has been defrosted (e.g., greater than 5 minutes, 15 minutes, 30 minutes, 1 hour, 2 hours, etc.), then the heat pump 200 can determine that the outdoor coil 208 should be defrosted. As described previously, when the heat pump 200 determines that the outdoor coil 208 should be defrosted, the heat pump can output one or more control signals to actuate the control valves 214A-D, actuate the reversing valve 212, and activate the first compressor 202A to cause refrigerant to flow in a reverse direction through the outdoor coil 208.

By circulating the refrigerant from the intercooler 210 to the outdoor coil 208, the heat pump 200 can utilize stored thermal energy from the TES material via the intercooler 210 to facilitate defrosting the outdoor coil 208. In this way, the heat pump 200 can provide advantage over existing heat pump systems which are configured to remove heat from the climate-controlled space to facilitate defrosting of the outdoor coil 208. Because heat is removed from the climate-controlled space to facilitate defrosting, existing heat pump systems generally require resistive heating elements or other supplemental heating to prevent the climate-controlled space from being cooled during the defrost operation. This leads to higher energy consumption and inefficient use of the heat pump. The heat pump 200 described herein, on the other hand, can facilitate defrosting of the outdoor coil 208 by utilizing the stored thermal energy from the TES material thereby avoiding the need to provide supplemental heating to the climate-controlled space and reducing the overall energy consumption of the heat pump 200. Although not shown in FIG. 2G, if the stored thermal energy in the TES material is insufficient to fully defrost the outdoor coil 208, the heat pump 200 can also facilitate defrosting of the outdoor coil 208 by actuating one or more control valves 214A-D to cause the refrigerant to circulate through the indoor coil 204 much like existing heat pump systems. The heat pump 200 can continue to operate in the defrost mode for a predetermined amount of time or until the heat pump 200 determines that the outdoor coil 208 has been sufficiently defrosted (e.g., the coil temperature is greater than the coil threshold temperature).

As illustrated in FIG. 2H, the heat pump 200 can also be configured to utilize the TES material for cooling applications. The heat pump 200, for example, can remove thermal energy from the climate-controlled space at the indoor coil 204 and move the thermal energy to the TES material at the intercooler 210 for storing the thermal energy. The heat pump 200 can activate the space cooling and TES charging mode, for example, when the indoor temperature is greater than an indoor threshold temperature and the TES temperature is less than a TES threshold temperature. The heat pump 200 can output one or more control signals to actuate the control valves 214A-D, actuate the second reversing valve 212B, and activate the second compressor 202B to cause the refrigerant to circulate from the indoor coil 204 to the intercooler 210. In this way, the heat pump 200 can be configured to facilitate cooling of the climate-controlled space by operating just the second compressor 202B.

FIG. 2I illustrates the heat pump 200 in a cascade cooling configuration. Similar to the cascade heating configuration illustrated and described in relation to FIG. 2F but in a reverse direction (e.g., as compared to cascade heating mode), the heat pump 200 can be configured to operate the second compressor 202B to move heat from the climate-controlled space via the indoor coil 204 to the intercooler 210. The heat pump 200 can be further configured to operate the first compressor 202A to move heat from the intercooler 210 to the outdoor coil 208. The heat pump 200 can be configured to operate in the cascade cooling mode, for example, when the indoor temperature is greater than the indoor threshold temperature the TES temperature is greater than the TES threshold temperature (e.g., the TES is fully charged and unable to absorb further thermal energy). By operating the first compressor 202A, the thermal energy removed from the climate-controlled space and added to the TES material at the intercooler 210 can be moved to the outdoor coil 208 and released to the atmosphere.

FIG. 4. illustrates a schematic diagram of a controller 440 and various components of the heat pump 200 described herein, in accordance with the disclosed technology. As illustrated in FIG. 4, the disclosed technology can include a controller 440 that can be configured to receive data and determine actions based on the received data. For example, the controller 440 can be configured to monitor the temperature of ambient air via an ambient air temperature sensor 450 and output control signals to the various components described herein to heat or cool the climate-controlled space. As another illustrative example, the controller 440 can be configured to monitor the indoor temperature of the climate-controlled space via an indoor temperature sensor 452 and output control signals to the various components described herein to heat or cool the climate-controlled space. As another illustrative example, the controller 440 can be configured to monitor the temperature of either the indoor coil 204 or the outdoor coil 208 and output control signals to the various components described herein to facilitate defrosting of the indoor coil 204 or the outdoor coil 208. As yet another illustrative example, the controller 440 can be configured to monitor the temperature of the refrigerant in the heat pump via a refrigerant temperature sensor 454 and output control signals to the various components described herein to heat or cool the climate-controlled space. The controller 440 can receive data from, or output data to, the user interface 448, the ambient air temperature sensor 450, the water temperature sensor 452, coil temperature sensor 453, the refrigerant temperature sensor 454, the TES temperature sensor 456, the first compressor 2020A, the second compressor 202B, the reversing valve 212, and the control valves 214A-D. Certain determinations and/or outputting of instructions described herein as being performed by the heat pump 200 can be understood to be performed by the controller 440. For example, description of the heat pump 200 determining the temperature of the air in the climate-controlled space is less than a threshold can be understood to mean that the controller 440 can receive temperature data from a corresponding temperature sensor and determine temperature data is indicative of an air temperature less than the threshold. As another example, description of the heat pump actuating a valve or a compressor can be understood to mean that the controller 440 can output instructions for the valve or compressor to actuate and/or operate.

The ambient air temperature sensor 450 can be configured to detect a temperature of the ambient air proximate the heat pump 200 (e.g., proximate the outdoor coil 208). The indoor temperature sensor 452 can be configured to detect a temperature of air circulated through a climate-controlled space (e.g., proximate the indoor coil 204 or proximate a thermostat or temperature controller of the heat pump 200). The coil temperature sensor 453 can be configured to detect a temperature of the indoor coil 204 and/or the outdoor coil 208 which can be indicative of whether frost has accumulated on the indoor coil 204 and/or the outdoor coil 208. Furthermore, the refrigerant temperature sensor 454 can be configured to detect a temperature of the refrigerant of the heat pump 200. The TES temperature sensor 456 can be configured to detect a temperature of the TES material in the intercooler 210. The TES temperature can be indicative of whether the TES material is in a fully charged or discharged state. Each of the temperature sensors can be any type of temperature sensor including a thermocouple, a resistance temperature detector, a thermistor, a semiconductor based integrated circuit, or any other suitable type of temperature sensor for the particular application. Furthermore, each of the temperature sensors described herein can be a temperature sensor configured to output temperature data or a thermostat configured change a state of the thermostat based on temperature (e.g., close one or more contacts based on the temperature reaching a temperature threshold).

As will be appreciated by one of skill in the art, some TES materials are designed to change phases between a charged and a discharged state. For example, some TES materials may be in a liquid form (or semi-liquid form) when fully charged and in a solid (or semi-solid) form when fully discharged. By including the TES temperature sensor 456 to detect a temperature of the TES material, the temperature of the TES material can be used to determine whether the TES material is in a charged state or a discharged state. For example a higher temperature can indicate the TES material is in a liquid phase (charged state) and a lower temperature can indicate that the TES material is in a solid phase (discharged state). As will be appreciated by one of skill in the art, however, the temperature of the TES material may remain near constant as the TES material undergoes a phase change or transitions between a fully charged state and a fully discharged state. To address this issue, the disclosed technology can include multiple temperature sensors placed in various locations throughout the TES material to better determined whether the TES material is in a charged or discharged state. Furthermore, the disclosed technology may include sensors that are configured to detect a conductivity or a viscosity of the TES material to help determine whether the TES material is in a charged or a discharged state. For example, depending on the type of TES material, a higher conductivity can indicate that the TES material is in a solid (or semi-solid) phase and in a discharged state while a lower conductivity can indicate that the TES material is in a liquid (or semi-liquid) phase and a charged state. As another example, a viscometer can be used to detect the viscosity of the TES material. A high viscosity can indicate the TES material is in a solid (or semi-solid) phase and a discharged state while a low viscosity can indicate the TES material is in a liquid (or semi-liquid) phase and a charged state.

The controller 440 can have a memory 442, a processor 444, and a communication interface 446. The controller 440 can be a computing device configured to receive data, determine actions based on the received data, and output a control signal instructing one or more components of the heat pump 200 to perform one or more actions. One of skill in the art will appreciate that the controller 440 can be installed in any location, provided the controller 440 is in communication with at least some of the components of the system. Furthermore, the controller 440 can be configured to send and receive wireless or wired signals and the signals can be analog or digital signals. The wireless signals can include Bluetooth™, BLE, WiFi™, ZigBee™, infrared, microwave radio, or any other type of wireless communication as may be suitable for the particular application. The hard-wired signal can include any directly wired connection between the controller and the other components described herein. Alternatively, the components can be powered directly from a power source and receive control instructions from the controller 440 via a digital connection. The digital connection can include a connection such as an Ethernet or a serial connection and can utilize any suitable communication protocol for the application such as Modbus, fieldbus, PROFIBUS, SafetyBus p, Ethernet/IP, or any other suitable communication protocol for the application. Furthermore, the controller 440 can utilize a combination of wireless, hard-wired, and analog or digital communication signals to communicate with and control the various components. One of skill in the art will appreciate that the above configurations are given merely as non-limiting examples and the actual configuration can vary depending on the particular application.

The controller 440 can include a memory 442 that can store a program and/or instructions associated with the functions and methods described herein and can include one or more processors 444 configured to execute the program and/or instructions. The memory 442 can include one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including the operating system, application programs (including, for example, a web browser application, a widget or gadget engine, and or other applications, as necessary), executable instructions and data. One, some, or all of the processing techniques or methods described herein can be implemented as a combination of executable instructions and data within the memory 442.

The controller 440 can also have a communication interface 446 for sending and receiving communication signals between the various components. Communication interface 446 can include hardware, firmware, and/or software that allows the processor(s) 444 to communicate with the other components via wired or wireless networks or connections, whether local or wide area, private or public, as known in the art. Communication interface 446 can also provide access to a cellular network, the Internet, a local area network, or another wide-area network as suitable for the particular application.

Additionally, the controller 440 can have or be in communication with a user interface 448 for displaying system information and receiving inputs from a user. The user interface 448 can be installed locally or be a remotely controlled device such as wall-mounted control unit or a mobile device. The user, for example, can view system data on the user interface 448 and input data or commands to the controller 440 via the user interface 448. For example, the user can view temperature threshold settings on the user interface 448 and provide inputs to the controller 440 via the user interface 448 to change a temperature threshold setting. The temperature threshold settings can be, for example, an indoor threshold temperature, ambient air threshold temperature, coil threshold temperature, a TES threshold temperature, and/or a refrigerant threshold temperature.

Figure 5:
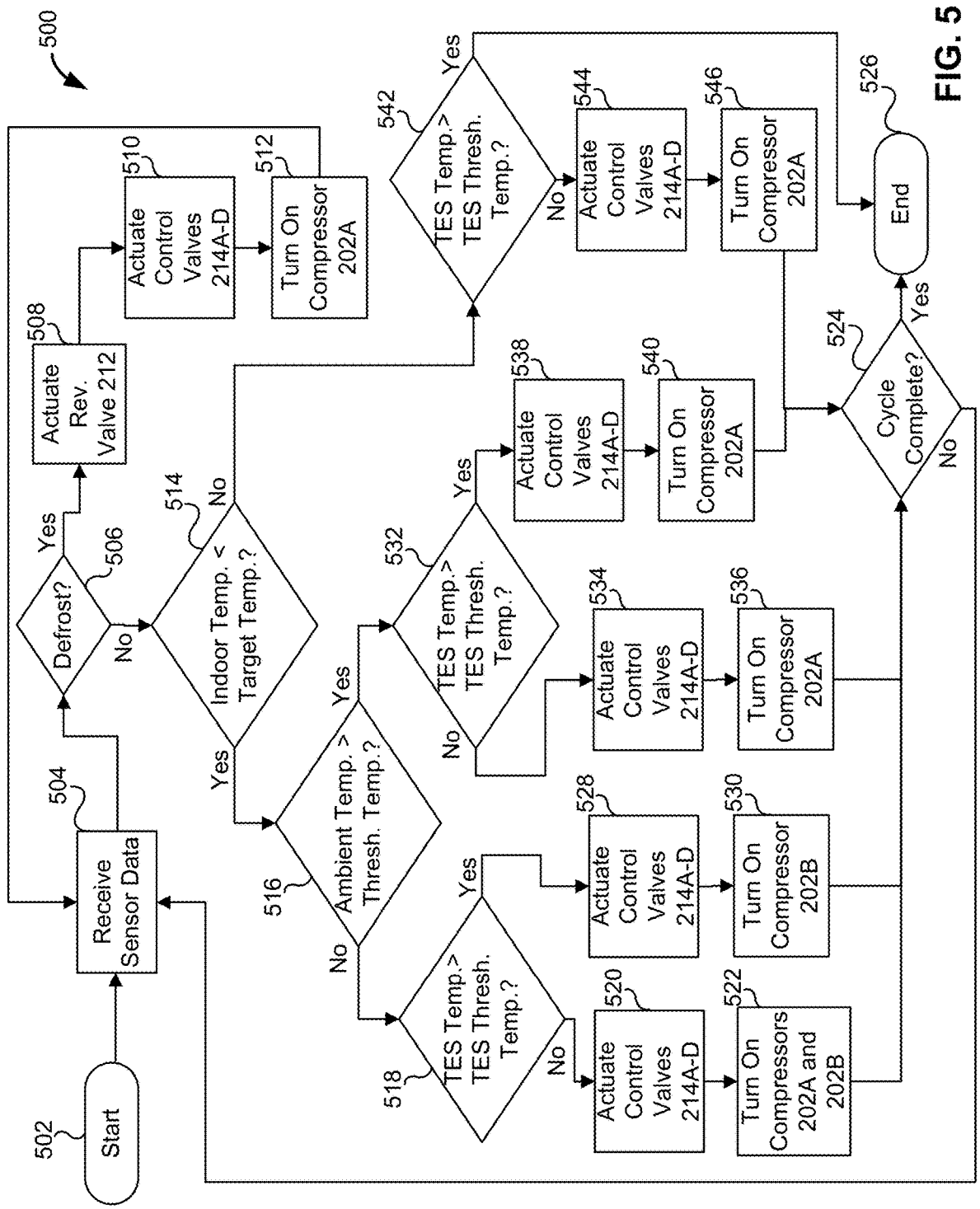
FIG. 5 illustrates a flow chart of a method of operating the heat pump system, in accordance with the disclosed technology.

FIG. 5 illustrates a flow chart of a method 500 of operating the heat pump system of FIGS. 2A-2I (i.e., heat pump 200), in accordance with the disclosed technology. The method 500 is offered merely for illustrative purposes and should not be construed as limiting as one of skill in the art will appreciate that the heat pump 200 can be operated according to any of the examples described herein for both heating and cooling of a climate-controlled space. Furthermore, the method 500 can be executed by the controller 440. For example, the method 500 can be executed by one or more processors 444 executing instructions stored on memory 442.

The method 500 can include starting 502 a logic sequence by receiving a start signal or by initiating the method 500 (e.g., as power is received to the controller 440). The method 500 can include receiving 504 sensor data from one or more sensors in the heat pump system (e.g., ambient temperature data from the ambient air temperature sensor 450, indoor temperature data from the indoor temperature sensor 452, coil temperature data from the coil temperature sensor 453, refrigerant temperature data from the refrigerant temperature sensor 454, TES temperature data from the TES temperature sensor 454, humidity data from a humidity sensor, flow data from a flow sensor, or any other data from a connected sensor).

The method 500 can include determining 506 whether the heat pump requires defrosting (e.g., defrosting of the outdoor coil 208). Determining 506 whether the heat pump requires defrosting can include comparing coil temperature data received from the coil temperature sensor 453 to a coil threshold temperature. If the coil temperature data indicates that the coil temperature is below (or likely to be below) the coil threshold temperature, the method 500 can include outputting 508 a control signal to actuate reversing valve 212 and outputting 510 a control signal to actuate the control valves 214A-D to cause the refrigerant to flow in a reverse direction through the outdoor coil 208 (e.g., from the compressor to the outdoor coil 208). The method 500 can further include outputting 512 a control signal to cause the compressor 202A to turn on or otherwise begin circulating refrigerant through the outdoor coil 208 (e.g., as illustrated and described in relation to FIG. 2G). As described previously, defrosting the outdoor coil 208 can be accomplished by either utilizing the heat energy stored by the TES material if sufficiently charged or by utilizing heat from the climate-controlled space.

If it is determined that the coil does not need to be defrosted, the method 500 can include determining 514 whether the indoor temperature is less than a target temperature. Determining 514 whether the indoor temperature is less than a target temperature can comprise comparing indoor temperature data from the indoor temperature sensor 452 to an indoor threshold temperature. The indoor threshold temperature, for example, can be a minimum temperature selected by an occupant or other user of the heat pump 200 such that the temperature in the climate-controlled space can be maintained at a temperature that would be comfortable for the occupant of the climate-controlled space.

If the indoor temperature is greater than or equal to the target temperature 514, the method 500 can include determining 542 whether the TES temperature is greater than a TES threshold temperature. The TES threshold temperature, for example, can be a temperature threshold indicative of the TES material being in a state wherein the TES material has absorbed heat energy and is storing the heat energy (e.g., in a liquid phase or a gas phase). If the TES temperature is greater than the TES threshold temperature, the method can include ending 526 the method 500. If the TES temperature is not greater than the TES threshold temperature, the method 400 can include outputting a control signal to actuate one or more of control valves 214A-D to cause refrigerant to circulate through the outdoor coil 208 and the intercooler 210 to cause heat energy to be transferred to, and stored by, the TES material (e.g., as illustrated and described in relation to FIG. 2C). The method 500 can then include determining 524 whether the cycle is complete. Determining 524 whether the cycle is complete in this instance, for example, can include determining whether the TES material temperature is greater than the TES threshold temperature. If the cycle is determined 524 to be complete, the method 500 can end 526. Ending the cycle can include shutting down compressors 202A, 202B or otherwise causing the compressors 202A, 202B to no longer cause refrigerant to be circulated through the heat pump 200. If the cycle is determined 524 to not be complete, the method 500 can include once again receiving sensor data 504 and continuing the method 500.

If the indoor temperature is less than the target temperature 514, on the other hand, the method can include determining 516 whether the ambient temperature is greater than an ambient threshold temperature. Determining 516 whether the ambient temperature is greater than the ambient threshold temperature can comprise, for example, comparing ambient temperate data received from the ambient temperature sensor 450 to the ambient threshold temperature. The ambient threshold temperature, for example, can be a temperature wherein the heat pump 200 begins to operate less efficiently due to less heat energy being available in the ambient air. For example, and not limitation, the ambient threshold temperature can be 32° F.—the temperature at which water begins to freeze. As another example, the ambient threshold temperature can be 40° F. or any other temperature at which it is known or expected that the particular heat pump will begin operating less efficiently.

If the ambient temperature is less than or equal to the ambient threshold temperature, the method 500 can include determining 518 whether the TES temperature is greater than the TES threshold temperature. If the TES temperature is less than or equal to the TES threshold temperature, the method 500 can include outputting 520 a control signal to one or more of the control valves 214A-D and outputting 522 a control signal to the first compressor 202A and the second compressor 202B to cause the heat pump 200 to operate in a cascading heat pump configuration (e.g., as illustrated and described in relation to FIG. 2F). In this way, the heat pump 200 can be configured to heat a climate-controlled space even if heat energy stored in the TES material is depleted and the ambient temperature is below the ambient threshold temperature. The method 500 can once again include determining 524 whether the cycle is complete. Determining 524 whether the cycle is complete in this instance, for example, can include determining whether the indoor temperature is greater than or equal to the target temperature indicating that the climate-controlled space has been sufficiently heated. If the cycle is determined 524 to be complete, the method 500 can end 526. If the cycle is determined 524 to not be complete, the method 500 can include once again receiving sensor data 504 and continuing the method 500.

If the ambient temperature is less than or equal to the ambient threshold temperature and the TES temperature is greater than the TES threshold temperature, the method 500 can include outputting 528 a control signal to actuate one or more of the control valves 214A-D to cause refrigerant to pass only through the second compressor 202B, the indoor coil 204, and the intercooler 210. The method 500 can further include outputting 530 a control signal to turn on the second compressor 202B and cause refrigerant to be circulated between the indoor coil 204 and the intercooler 210 (e.g., as illustrated and described in relation to FIG. 2E). In this way, the heat pump 200 can utilize the heat energy stored by the TES material to heat the climate-controlled space. As will be appreciated, by utilizing the heat energy stored in the TES material, the heat pump 200 can operate more efficiently than traditional cascade heap pump heating systems because only a single compressor (i.e., the second compressor 202B) need be operated. The method 500 can once again include determining 524 whether the cycle is complete. Determining 524 whether the cycle is complete in this instance, for example, can include determining whether the indoor temperature is greater than or equal to the target temperature indicating that the climate-controlled space has been sufficiently heated. If the cycle is determined 524 to be complete, the method 500 can end 526. If the cycle is determined 524 to not be complete, the method 500 can include once again receiving sensor data 504 and continuing the method 500.

If the ambient temperature is greater than the ambient threshold temperature, the method 500 can include determining 532 whether the temperature of the TES material is greater than the TES threshold temperature. If the TES threshold temperature is less than or equal to the TES threshold temperature, the method 500 can include outputting 534 one or more control signals to actuate control valves 214A-D and outputting 536 a control signal to the first compressor 202A to cause refrigerant to pass through the indoor coil 204, the outdoor coil 208, and the intercooler 210 from the first compressor 202A (e.g., as illustrated and described in relation to FIG. 2D). In this way, the heat pump 200 can facilitate both heating of the climate-controlled space and charging of the TES material (e.g., adding heat energy to the TES material). The method 500 can once again include determining 524 whether the cycle is complete. Determining 524 whether the cycle is complete in this instance, for example, can include determining whether the indoor temperature is greater than or equal to the target temperature indicating that the climate-controlled space has been sufficiently heated. If the cycle is determined 524 to be complete, the method 500 can end 526. If the cycle is determined 524 to not be complete, the method 500 can include once again receiving sensor data 504 and continuing the method 500.

If the ambient temperature is greater than the ambient threshold temperature but the TES temperature is greater than the TES threshold temperature, the method 500 can include outputting 538 a control signal to actuate one or more of control valves 214A-D and outputting 540 a control signal to the first compressor 202A to cause refrigerant to be circulated through the indoor coil 204 and the outdoor coil 208 but not through the intercooler 210 (e.g., as illustrated and described in relation to FIG. 2A). In this way, the heat pump 200 can provide heat to the climate-controlled space without needing to add heat to the TES material because it is already sufficiently heated. The method 500 can once again include determining 524 whether the cycle is complete. Determining 524 whether the cycle is complete in this instance, for example, can include determining whether the indoor temperature is greater than or equal to the target temperature indicating that the climate-controlled space has been sufficiently heated. If the cycle is determined 524 to be complete, the method 500 can end 526. If the cycle is determined 524 to not be complete, the method 500 can include once again receiving sensor data 504 and continuing the method 500.

As will be appreciated, the method 500 just described can be varied in accordance with the various elements and implementations described herein. That is, methods in accordance with the disclosed technology can include all or some of the steps or components described above and/or can include additional steps or components not expressly disclosed above. Further, methods in accordance with the disclosed technology can include some, but not all, of a particular step described above. Further still, various methods described herein can be combined in full or in part. That is, methods in accordance with the disclosed technology can include at least some elements or steps of a first method and at least some elements or steps of a second method. Moreover, the methods described herein are not limited to the specific order of operations discussed.

Figure 6A:
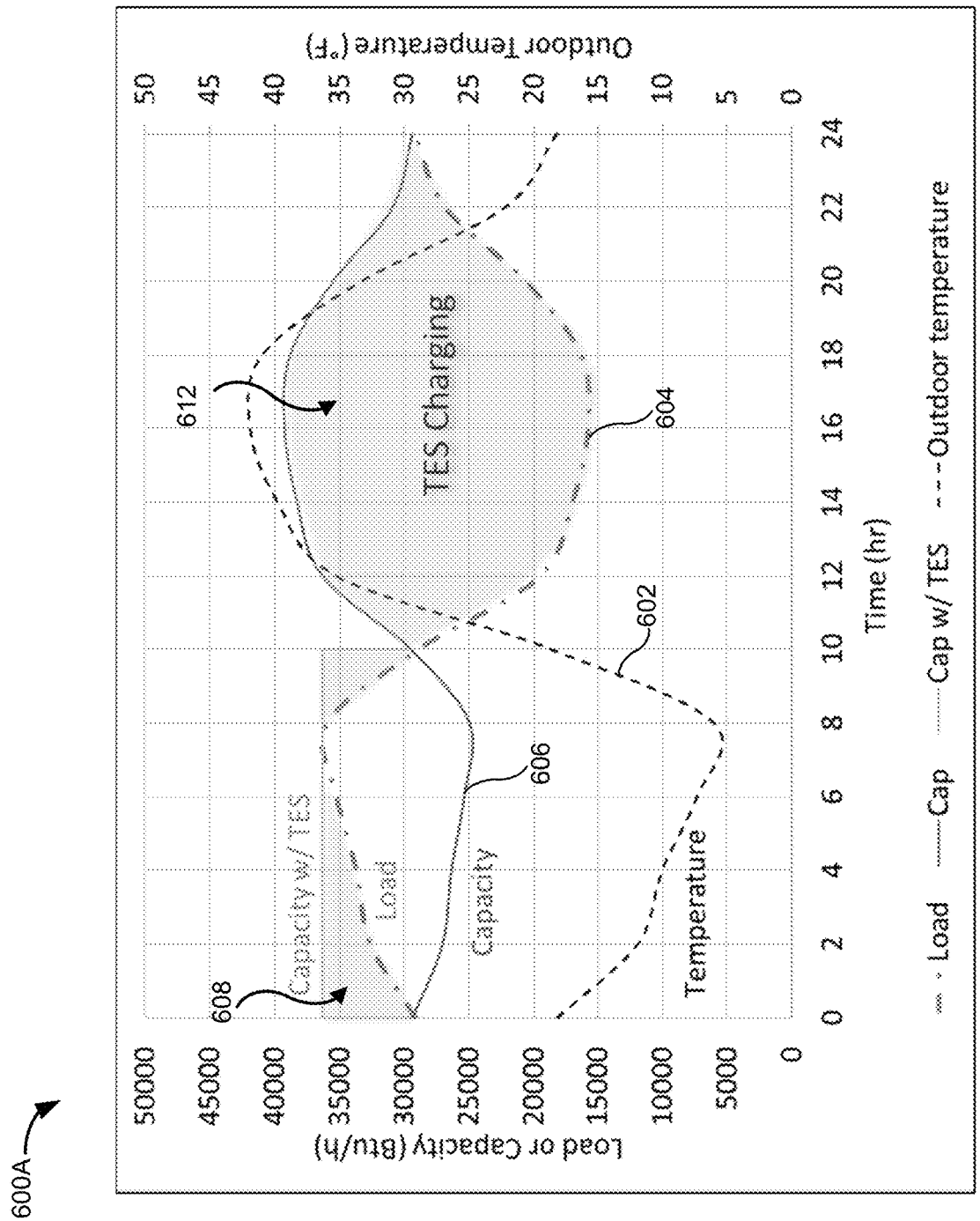
FIGS. 6A and 6B are charts illustrating a load capacity and coefficient of performance, respectively, of the heat pump system, in accordance with the disclosed technology.
Figure 6B:
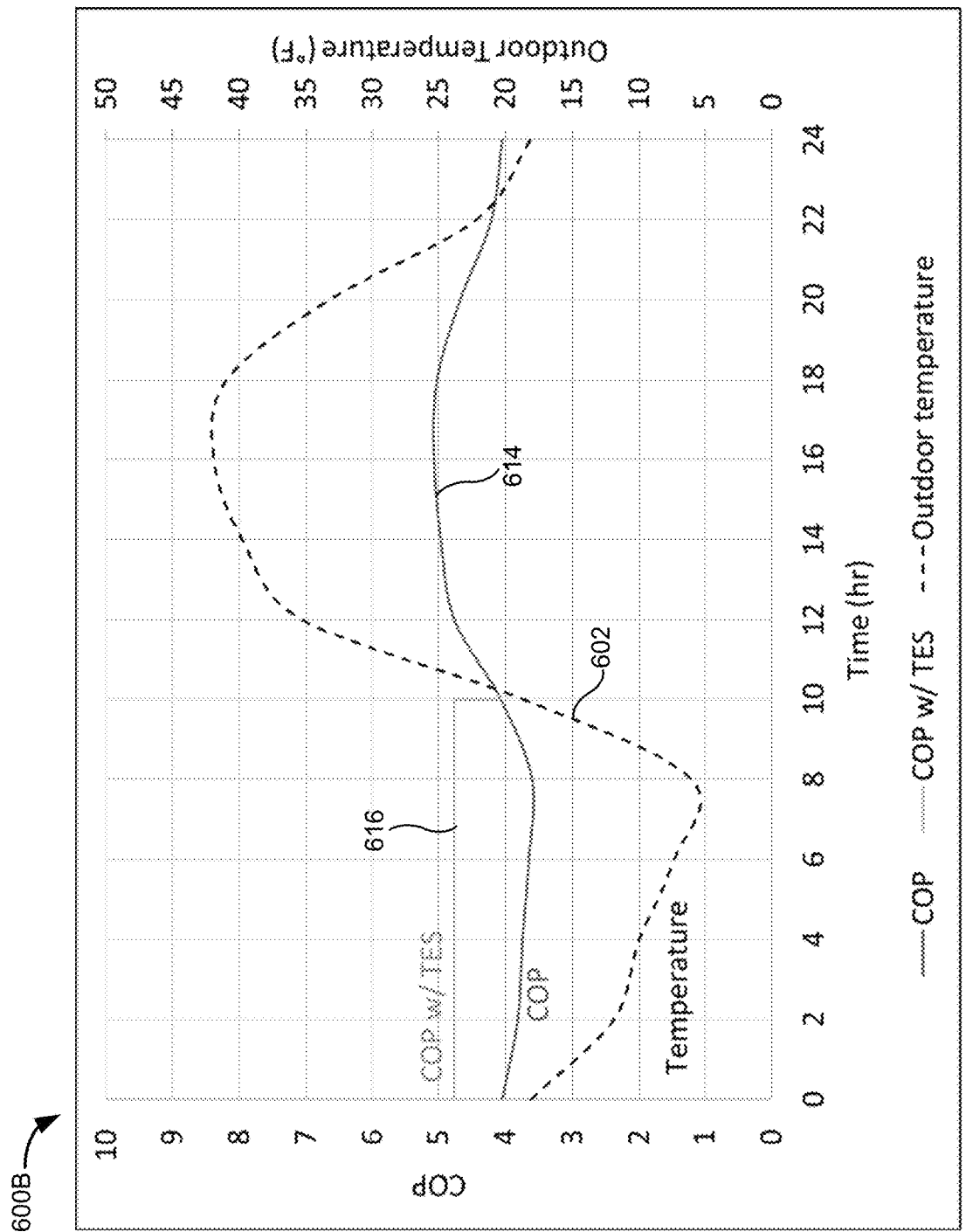

FIGS. 6A-6B are charts illustrating a load capacity and coefficient of performance, respectively, of the heat pump 200, in accordance with the disclosed technology. As illustrated in FIG. 6A, as the ambient temperature 602 varies throughout the day and night, the load 604 and the capacity 606 of the heat pump 200 will also vary to meet a heat demand of the climate-controlled space. For example, as the ambient temperature 602 rises during the day, the load 604 will fall and the capacity 606 of the heat pump 200 will increase due to its ability to transfer a greater amount of heat energy from the ambient air. Conversely, as the ambient temperature 602 falls during the night, the load 604 will increase and the capacity 606 of the heat pump 200 will decrease due to its ability to transfer less thermal energy from the ambient air.

By incorporating the TES material in the intercooler 210, the heat pump 200 can effectively extend the capacity 606 of the heat pump 200 to meet the load demand when cooler temperatures are present (e.g., at night). As illustrated in FIG. 6A, the capacity of the heat pump 200 with the TES material (i.e., as indicated by region 608) is extended and the heat pump 200 is able to sufficiently meet the heat demand. The region 608 can be representative of the heat pump's 200 excess capacity when operating in the space heating and TES discharging mode illustrated and discussed in relation to FIG. 2E. In this mode, the capacity of the heat pump 200 is constant and does not change with ambient temperature since the heat pump 200 transfers energy from the fixed temperature source coming from the TES material. The heat pump system will cycle to meet the heating load 604. Furthermore, when the thermal energy stored in the TES material is depleted but a heat demand is still present, the heat pump 200 can activate the cascade heating mode as shown and described in relation to FIG. 2F.

As will be appreciated by one of skill in the art with the benefit of this disclosure, as the ambient temperature 602 rises and load 604 falls, the heat pump's 200 capacity 606 also rises. In this scenario, the heat pump 200 can be configured to provide TES charging 612 to utilize the heat pump's available capacity 606. The heat pump 200, for example, can activate the TES charging mode as shown and described in relation to FIG. 2C or the TES charging and heating mode as shown and described in relation to FIG. 2D.

As illustrated in FIG. 6B, as the ambient temperature 602 varies throughout the day, the heat pump's 200 coefficient of performance (COP) 614 will also vary. By incorporating the TES material into the heat pump 200, the heat pump's 200 COP 616 can be maintained at a constant higher level even when the ambient temperature 602 falls. This is due to the fact that the heat pump 200 now operates between a fixed TES material temperature and the indoor temperature. As will be appreciated by one of skill in the art, by extending the heat pump's COP and capacity with the TES (as illustrated by 608 and 616), the heat pump 200 can meet the load demand required for heating a climate-controlled space while reducing the amount of energy required to meet the load demand.

While the present disclosure has been described in connection with a plurality of exemplary aspects, as illustrated in the various figures and discussed above, it is understood that other similar aspects can be used, or modifications and additions can be made to the described subject matter for performing the same function of the present disclosure without deviating therefrom. In this disclosure, methods and compositions were described according to aspects of the presently disclosed subject matter. But other equivalent methods or compositions to these described aspects are also contemplated by the teachings herein. Therefore, the present disclosure should not be limited to any single aspect, but rather construed in breadth and scope in accordance with the appended claims.

What is claimed is:

1. A heat pump system comprising:
a first heat exchanger configured to facilitate heat exchange between ambient air proximate the first heat exchanger and a refrigerant;
a second heat exchanger configured to facilitate heat exchange between the refrigerant and air supplied to a climate-controlled space;
a third heat exchanger comprising a thermal energy storage (TES) material, a first fluid pathway, and a second fluid pathway;
a first compressor and a second compressor;
a first fluid path comprising the first compressor, the first heat exchanger, and the first fluid pathway of the third heat exchanger, the first fluid path being configured to selectively direct at least some of the refrigerant therethrough;
a second fluid path comprising the second compressor, the second heat exchanger, and the second fluid pathway of the third heat exchanger, the second fluid path being configured to selectively direct at least some of the refrigerant therethrough;
a TES temperature sensor configured to detect a temperature of the TES material;
an ambient air temperature sensor configured to detect a temperature of the ambient air proximate the first heat exchanger; and
a controller configured to:
receive TES temperature data from the TES temperature sensor;
determine, based at least in part on the TES temperature data, whether to actuate one or more control valves to permit refrigerant to flow to the first heat exchanger, the second heat exchanger, or the third heat exchanger;
receive ambient air temperature data from the ambient air temperature sensor;
determine, based at least in part on the ambient air temperature data, that the temperature or the ambient air is less than or equal to an ambient air threshold temperature;
determine, based at least in part on the TES temperature data, that the temperature of the TES material is greater than a TES threshold temperature;
in response to determining that the temperature of the ambient air is less than or equal to the ambient air threshold temperature and the temperature of the TES material is greater than the TES threshold temperature:
output a control signal to: (1) actuate the one or more control valves to permit the refrigerant to flow between the second heat exchanger and the third heat exchanger, and (2) activate the second compressor to cause refrigerant to flow between the second heat exchanger and the third heat exchanger to heat the climate-controlled space;
wherein the first compressor is configured to selectively facilitate heat exchange, via the refrigerant in the first fluid path, between the ambient air proximate the first heat exchanger and the TES material in the third heat exchanger, and
wherein the second compressor is configured to selectively facilitate heat exchange, via the refrigerant in the second fluid path, between the TES material in the third heat exchanger and air supplied to the climate-controlled space proximate the second heat exchanger.

2. The heat pump system of claim 1 further comprising:
the one or more control valves configured to control a flow of the refrigerant to the first heat exchanger, the second heat exchanger, and the third heat exchanger.

3. The heat pump system of claim 2, wherein the controller is further configured to:
determine, based at least in part on the TES temperature data, whether the temperature of the TES material is greater than a TES threshold temperature; and
in response to determining that the temperature of the TES material is greater than the TES threshold temperature:
output a control signal to: (1) actuate the one or more control valves to permit the refrigerant to flow between the second heat exchanger and the third heat exchanger, and (2) activate the second compressor to cause the refrigerant to flow between the third heat exchanger and the second heat exchanger to heat the climate-controlled space.

4. The heat pump system of claim 3, wherein the controller is further configured to:
in response to determining that the temperature of the TES material is less than or equal to the TES threshold temperature:
output a control signal to: (1) actuate the one or more control valves to permit the refrigerant to flow between the first heat exchanger and the third heat exchanger, and (2) activate the first compressor to cause the refrigerant to flow between the first heat exchanger and the third heat exchanger to provide thermal energy to the TES material.

5. The heat pump system of claim 2 further comprising:
a coil temperature sensor configured to detect a temperature of the first heat exchanger; and
a reversing valve configured to reverse a direction of the flow of the refrigerant, wherein the controller is further configured to:
receive coil temperature data from the coil temperature sensor;
determine, based at least in part on the coil temperature data, whether the temperature of the first heat exchanger is less than or equal to a coil threshold temperature, the coil threshold temperature being a temperature at which frost will begin to accumulate on the first heat exchanger;
in response to determining that the temperature of the first heat exchanger is less than or equal to the coil threshold temperature:
output a control signal to: (1) actuate the reversing valve to reverse a direction of the flow of the refrigerant, (2) actuate the one or more control valves to permit the refrigerant to flow between the first heat exchanger and the second heat exchanger, and (3) activate the first compressor to cause refrigerant to flow between the first heat exchanger and the second heat exchanger to defrost the first heat exchanger.

6. The heat pump system of claim 5, wherein the controller is further configured to:
in response to determining that the temperature of the first heat exchanger is less than or equal to the coil threshold temperature and the temperature of the TES material is greater than the TES threshold temperature:
output a control signal to: (1) actuate the reversing valve to reverse a direction of the flow of the refrigerant, (2) actuate the one or more control valves to permit the refrigerant to flow between the first heat exchanger and the third heat exchanger, and (3) activate the first compressor to cause refrigerant to flow between the first heat exchanger and the third heat exchanger to defrost the first heat exchanger.

7. The heat pump system of claim 1, wherein the controller is further configured to:
in response to determining that the temperature of the ambient air is less than or equal to the ambient air threshold temperature and the temperature of the TES material is less than or equal to the TES threshold temperature:
output a control signal to: (1) actuate the one or more control valves to permit the refrigerant to flow between the first heat exchanger and the third heat exchanger and between the second heat exchanger and the third heat exchanger, (2) activate the first compressor to cause the refrigerant to flow between the first heat exchanger and the third heat exchanger to provide thermal energy to the TES material, and (3) activate the second compressor to cause refrigerant to flow between the third heat exchanger and the second heat exchanger to heat the climate-controlled space.

8. The heat pump system of claim 1, wherein the controller is further configured to:
in response to determining that the temperature of the ambient air is greater than the ambient air threshold temperature and the temperature of the TES material is greater than the TES threshold temperature:
output a control signal to: (1) actuate the one or more control valves to permit the refrigerant to flow between the first heat exchanger and the second heat exchanger, and (2) activate the first compressor to cause the refrigerant to flow between the first heat exchanger and the second heat exchanger to heat the climate-controlled space.

9. The heat pump system of claim 1, further comprising:
an indoor air temperature sensor configured to detect a temperature of air in the climate controlled space, the controller being further configured to:
receive indoor air temperature data from the indoor air temperature sensor;
determine, based at least in part on the indoor air temperature data, whether the temperature in the climate-controlled space is less than or equal to an indoor threshold temperature;
in response to determining that the temperature of the air in the climate-controlled space is less than an indoor air threshold temperature, the ambient air is less than or equal to the ambient air threshold temperature, and the temperature of the TES material is greater than the TES threshold temperature:
output a control signal to: (1) actuate the one or more control valves to permit the refrigerant to flow between the second heat exchanger and the third heat exchanger, and (2) activate the second compressor to cause refrigerant to flow between the second heat exchanger and the third heat exchanger to heat the climate-controlled space.

10. The heat pump system of claim 9, wherein the controller is further configured to:
in response to determining that the temperature of the air in the climate-controlled space is less than an indoor air threshold temperature and the temperature of the TES material is less than or equal to the TES threshold temperature:
output a control signal to: (1) actuate the one or more control valves to permit the refrigerant to flow between the first heat exchanger and the third heat exchanger and between the second heat exchanger and the third heat exchanger, (2) activate the first compressor to cause the refrigerant to flow between the first heat exchanger and the third heat exchanger to provide thermal energy to the TES material, and (3) activate the second compressor to cause refrigerant to flow between the third heat exchanger and the second heat exchanger to heat the climate-controlled space.

11. The heat pump system of claim 9 further comprising:
a reversing valve configured to reverse a direction of the flow of the refrigerant, wherein the controller is further configured to:
in response to determining that the temperature of the air in the climate-controlled space is greater than the indoor air threshold temperature:
output a control signal to: (1) actuate the reversing valve to reverse a direction of the flow of the refrigerant, (2) actuate the one or more control valves to permit the refrigerant to flow between the first heat exchanger and the second heat exchanger, and (3) activate the first compressor to cause refrigerant to flow between the first heat exchanger and the second heat exchanger to cool the climate-controlled space.

12. The heat pump system of claim 1 wherein the third heat exchanger comprises:
a shell configured to house the TES material;
a first tube bundle configured to receive the refrigerant in the first fluid path; and
a second tube bundle configured to receive the refrigerant in the second fluid path.

13. The heat pump system of claim 1 wherein the third heat exchanger comprises:
a first tube configured to receive the refrigerant in the first fluid path;
a second tube configured to house the first tube and the TES material; and
a third tube configured to house the first tube and the second tube and receive the refrigerant in the second fluid path.

14. The heat pump system of claim 1 wherein the third heat exchanger is a microchannel heat exchanger comprising:
a first microchannel tube configured to receive the refrigerant in the first fluid path;
a second microchannel tube configured to receive the refrigerant in the second fluid path; and
a housing having a plurality of plates and configured to house the TES material.

15. A method of controlling a heat pump, the method comprising:
receiving thermal energy storage (TES) temperature data from a TES temperature sensor, the TES temperature sensor being configured to detect a temperature of a TES material;

determining, based at least in part on the TES temperature data, whether to actuate one or more control valves and activate a compressor of the heat pump to cause refrigerant to flow through at least one of a first heat exchanger, a second heat exchanger, or a third heat exchanger;

determining, based at least in part on the TES temperature data, that the temperature of the TES material is greater than a TES threshold temperature; and in response to determining that the temperature of the TES material is greater than the TES threshold temperature:

outputting a control signal to: (1) actuate the one or more control valves to permit the refrigerant to flow between the second heat exchanger and the third heat exchanger, and (2) activate the compressor to cause the refrigerant to flow between the second heat exchanger and the third heat exchanger to heat the climate-controlled space;

wherein the first heat exchanger is configured to facilitate heat exchange between ambient air and a refrigerant, the second heat exchanger is configured to facilitate heat exchange between the refrigerant and air supplied to a climate-controlled space, and the third heat exchanger comprises the TES material and is configured to facilitate heat exchange between the TES material and at least one of the refrigerant in a first fluid path or the refrigerant in a second fluid path.

16. The method of claim 15, further comprising:

in response to determining that the temperature of the TES material is less than or equal to the TES threshold temperature:

outputting a control signal to: (1) actuate the one or more control valves to permit the refrigerant to flow between the first heat exchanger and the third heat exchanger, and (2) activate the compressor to cause the refrigerant to flow between the first heat exchanger and the third heat exchanger to provide thermal energy to the TES material.

17. The method of claim 15 further comprising:

receiving, from an ambient air temperature sensor configured to detect a temperature of ambient air, ambient air temperature data;

determining, based at least in part on the ambient air temperature data, whether the temperature or the ambient air is less than or equal to an ambient air threshold temperature;

determining, based at least in part on the TES temperature data, whether the temperature of the TES material is greater than a TES threshold temperature;

in response to determining that the temperature of the ambient air is less than or equal to the ambient air threshold temperature and the temperature of the TES material is greater than the TES threshold temperature:

outputting a control signal to: (1) actuate the one or more control valves to permit the refrigerant to flow between the second heat exchanger and the third heat exchanger, and (2) activate the compressor to cause refrigerant to flow between the second heat exchanger and the third heat exchanger to heat the climate-controlled space.

18. The method of claim 17, wherein the compressor comprises a first compressor and a second compressor, the method further comprising:

in response to determining that the temperature of the ambient air is less than or equal to the ambient air threshold temperature and the temperature of the TES material is less than or equal to the TES threshold temperature:

outputting a control signal to: (1) actuate the one or more control valves to permit the refrigerant to flow between the first heat exchanger and the third heat exchanger and between the second heat exchanger and the third heat exchanger, (2) activate the first compressor to cause the refrigerant to flow between the first heat exchanger and the third heat exchanger to provide thermal energy to the TES material, and (3) activate the second compressor to cause refrigerant to flow between the third heat exchanger and the second heat exchanger to heat the climate-controlled space.

\* \* \* \* \*